United States Patent [19]

Suchoff et al.

[11] 4,394,649
[45] Jul. 19, 1983

[54] COMMUNICATION TERMINAL PROVIDING USER COMMUNICATION OF HIGH COMPREHENSION

[75] Inventors: Michael A. Suchoff, Brookline; Holly T. Doyle; Robert O. Doyle, both of Cambridge, all of Mass.

[73] Assignee: I/O Corporation, Santa Monica, Calif.

[21] Appl. No.: 173,263

[22] Filed: Jul. 28, 1980

[51] Int. Cl.³ .............................................. G09G 3/04
[52] U.S. Cl. ................................... 340/711; 340/706; 340/792; 340/721
[58] Field of Search ............... 340/706, 792, 311, 711, 340/311.1, 365 R, 791, 721; 179/5.5

[56] References Cited

U.S. PATENT DOCUMENTS

| | | | |
|---|---|---|---|
| 3,432,846 | 3/1969 | Jones et al. | 340/792 |
| 3,493,956 | 2/1970 | Andrews et al. | 340/792 |
| 3,976,995 | 8/1976 | Sebestyen | 340/792 |
| 4,007,443 | 2/1977 | Bromberg et al. | 340/311 |
| 4,185,281 | 1/1980 | Silverstone | 340/706 |
| 4,241,238 | 12/1980 | Strand | 179/5.5 |
| 4,242,539 | 12/1980 | Hashimoto | 179/5.5 |
| 4,251,813 | 2/1981 | Carre | 340/706 |

FOREIGN PATENT DOCUMENTS 1178820  9/1968  United Kingdom.

OTHER PUBLICATIONS

Micon Industries Flier Entitled "Pocketerm Mobile Data Communications Device".
MSI Data Corp. Brochure Entitled "Series 88 Portable Data Terminals for Every Application".
"The Hand-Held Computer"Editorial, *Byte Magazine*, Jan. 1981, vol. 6, No. 1, pp. 7, 8.
*Design of Man-Computer Dialogues* by James Martin, Copyright 1973 by Prentice-Hall, Inc. Englewood Cliffs, N.J.

*Primary Examiner*—Marshall M. Curtis
*Attorney, Agent, or Firm*—Kenway & Jenney

[57] ABSTRACT

A keyboard and display terminal displays alphanumeric characters with a split screen format and with selective scrolling to display both host message information and user message information in a highly comprehensible manner. The terminal provides further message information to a user with kinetic punctuation of the message display and with audible cues. The terminal also provides automatic repertory dialing directly to a telephone line, and monitors the line for the user.

The terminal can employ a display element of limited capacity, and yet provides high comprehension to an unskilled user. The terminal provides the user with both message information and operating reports for enhanced intelligibility.

The terminal further sends a host a terminal-identifying code which can uniquely identify that terminal.

28 Claims, 36 Drawing Figures

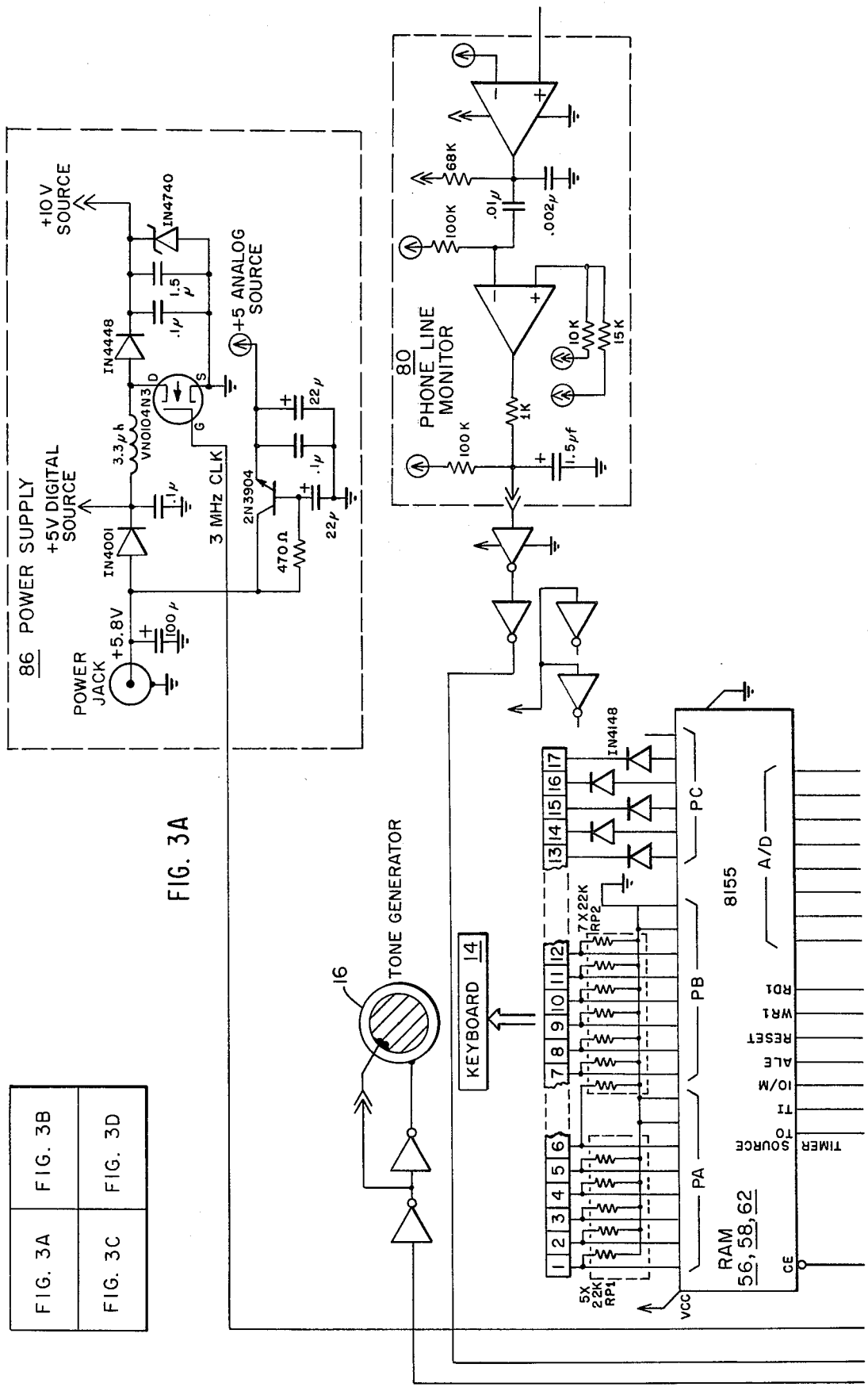

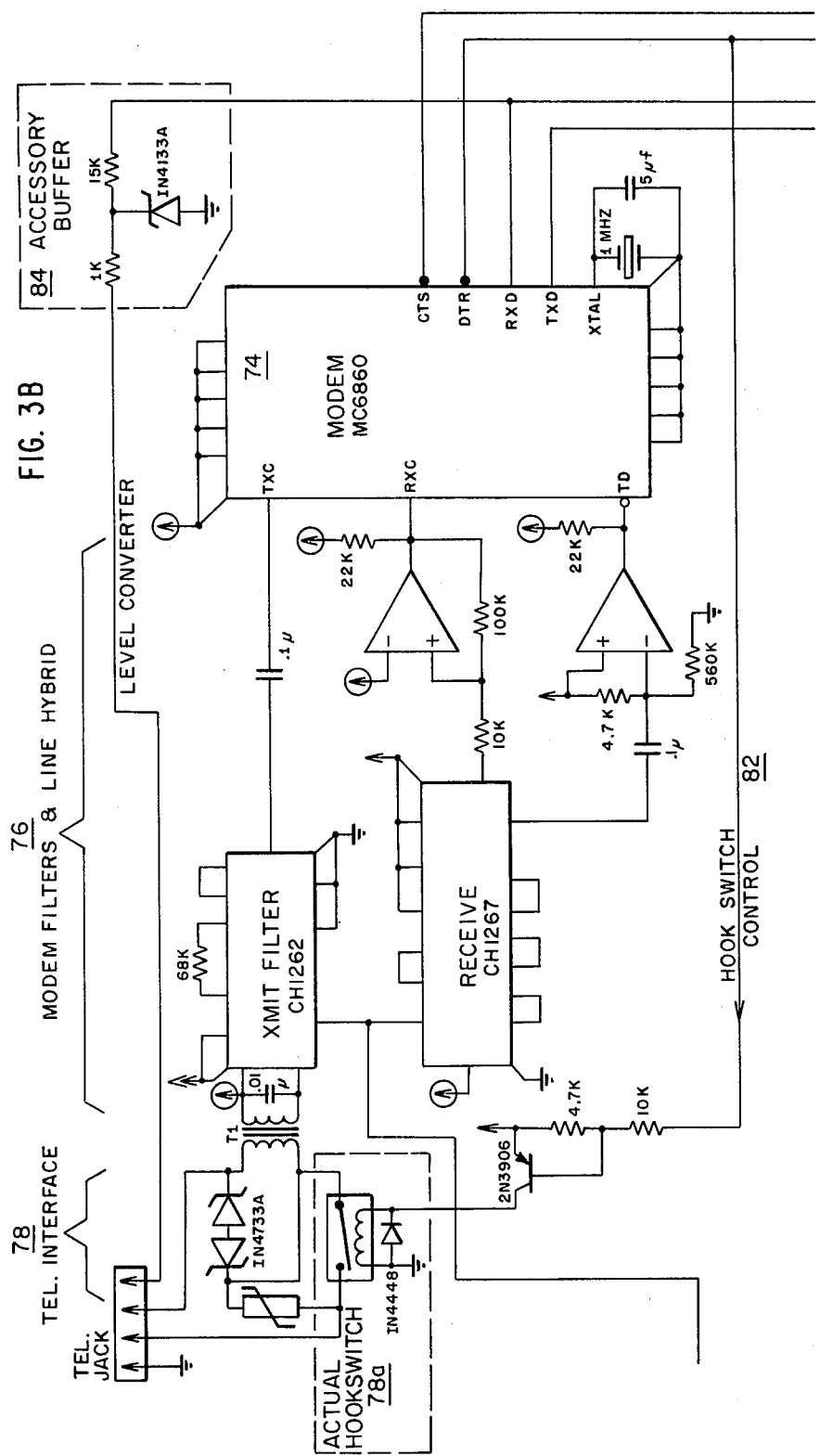

$$F_{OUT} = \frac{2}{\text{BEEPER PERIOD} \times 208\,\mu\,\text{sec}}$$

| VALUE OF BEEPER PERIOD | FREQUENCY OF OUTPUT |
|---|---|
| 1 | 2400 Hz |
| 2 | 1200 Hz |
| 3 | 800 Hz |
| 4 | 600 Hz |
| 5 | 480 Hz |
| 6 | 400 Hz |
| ⋮ | ⋮ |

THIS DIAGRM SHOWS THE TERMINAL MODE STATE TRANSITIONS
IN THE MAIN PROGRAM LOOP.

LOOP HERE UNTIL USER PRESSES YES, SELECTING A HOST

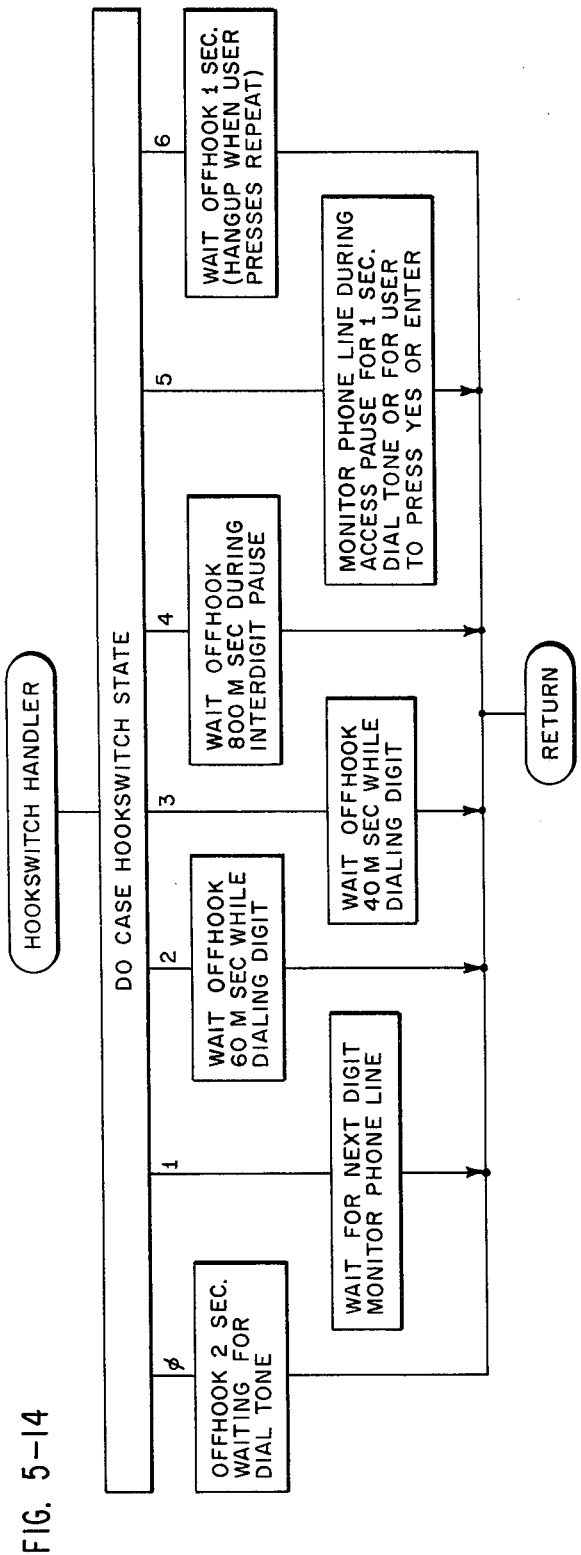
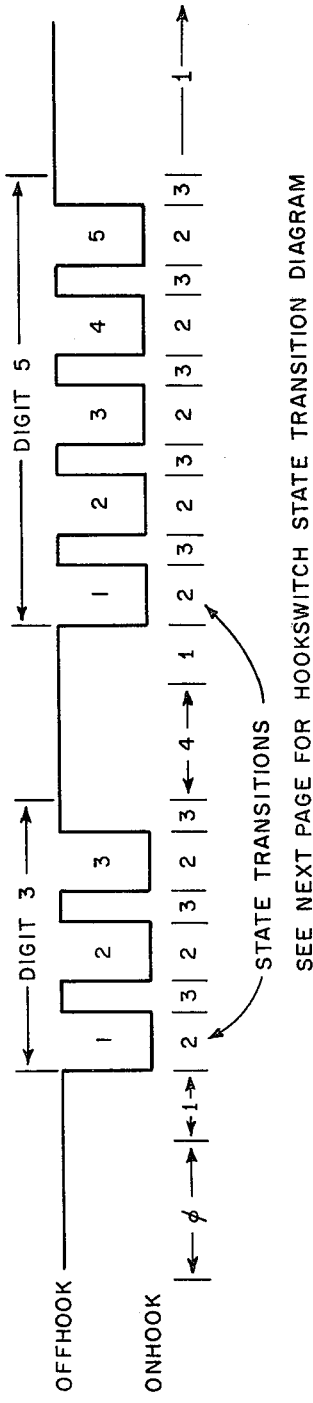
FIG. 5-14

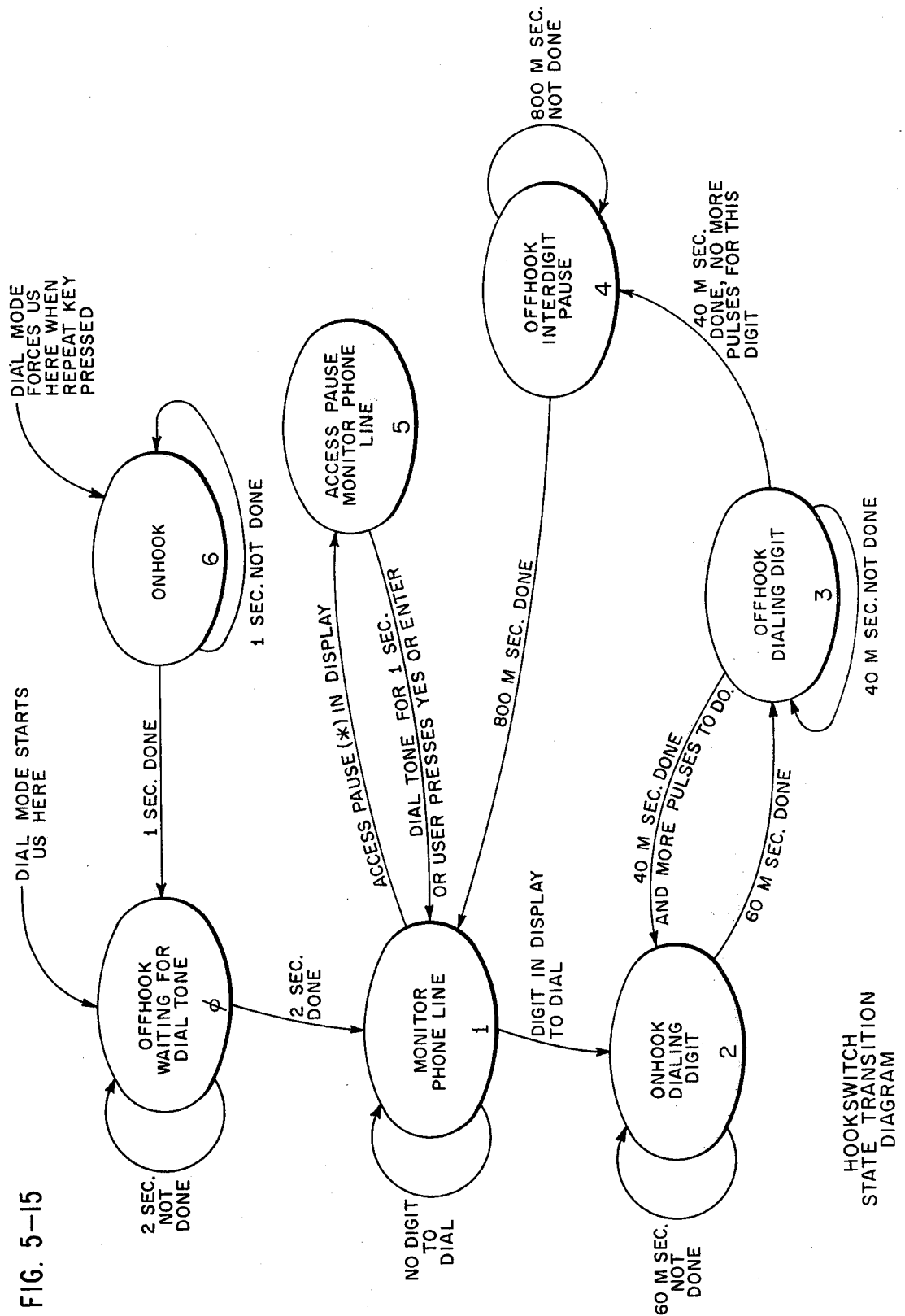

FIG. 6-1

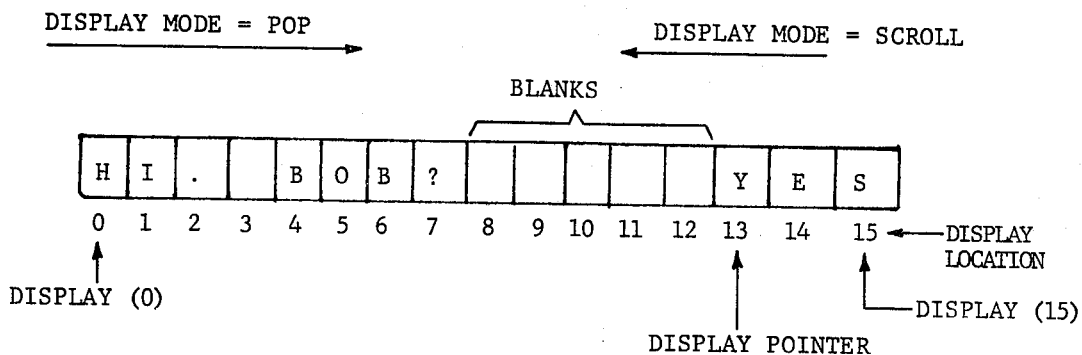

PROCESS HOST CHARACTER FLOW CHARTED
TO EXPLAIN DISPLAY MANAGEMENT.

DEFINITION OF TERMS USED IN THIS APPENDIX

DISPLAY MODE - A VARIABLE INDICATING CHARACTERS ARE ENTERED
LEFT TO RIGHT AT 300 BAUD (DISPLAY MODE = POP)
OR INDICATING CHARACTERS ARE SHIFTED IN FROM
THE RIGHT AT A USER SET RATE (DISPLAY MODE = SCROLL).

DISPLAY POINTER - A VARIABLE POINTING TO A DISPLAY LOCATION USED
TO MAINTAIN SPLIT SCREEN.
IF DISPLAY MODE = POP, THEN DISPLAY POINTER
CONTAINS LOCATION WHERE NEXT CHARACTER
RECEIVED IS PLACED.
IF DISPLAY MODE = SCROLL, THEN DISPLAY POINTER
CONTAINS LOCATION OF FIRST CHARACTER OF MESSAGE
ENTERING FROM RIGHT.

DISPLAY (0) - LEFTMOST PHYSICAL DISPLAY ELEMENT

DISPLAY (15) - RIGHTMOST PHYSICAL DISPLAY ELEMENT

PROCESS HOST CHAR FLOWCHART

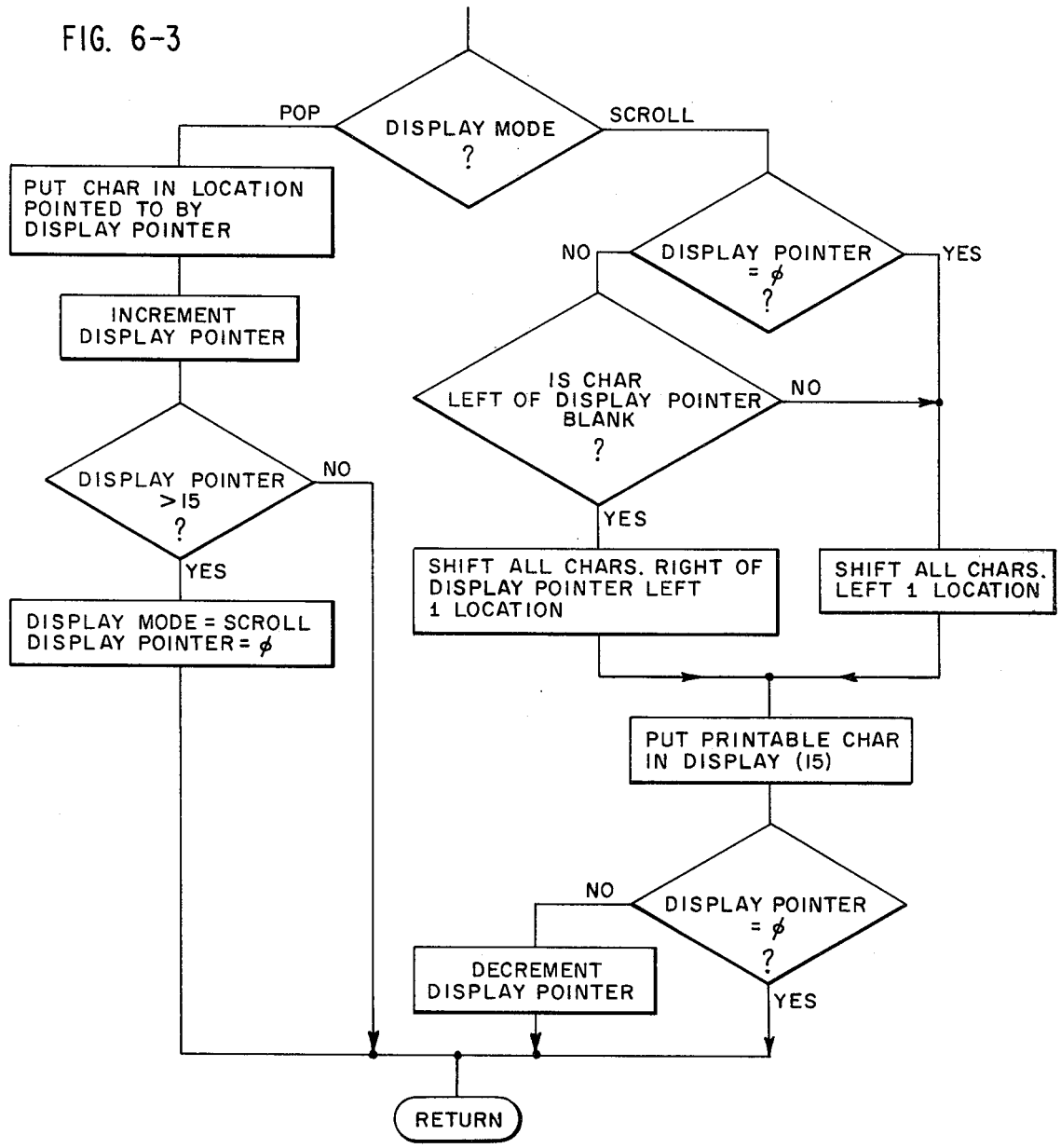

COMMUNICATION TERMINAL PROVIDING USER COMMUNICATION OF HIGH COMPREHENSION

BACKGROUND

This invention relates to a keyboard and display terminal for providing communication between a user and a data processing host. The communication typically is over telephone lines, but the invention is not limited in this regard for it has applicability to radio and other forms of communication.

Terminals for data processing communication are well known. However, efforts to make them small and available at low cost have had only limited value. Likewise, efforts to make low cost terminals suitable for use by unskilled persons have been relatively unsatisfactory. For example, a small, limited capacity display as generally used to attain a compact and low cost terminal has heretofore sharply restricted user comprehension of messages. Such a terminal consequently is of restricted usefulness to a skilled user and is difficult for an untrained person to use.

It is accordingly an object of this invention to provide a keyboard and display terminal that displays message information in a highly comprehensible manner.

It is also an object to provide a keyboard and display terminal that both presents message information and reports operating events with enhanced intelligibility.

Another object is to provide a keyboard and display terminal that provides the user with message information by means of multiple display events.

A further object is to provide a keyboard and display terminal which has the foregoing features even when equipped with a display element of limited capacity.

Another object of the invention is to provide a keyboard and display terminal of the above character which provides automatic dialing directly to a telephone line. It is also an object that the terminal provide dialing from a repertory of numbers it stores, and without using an intervening acoustic or other couples.

Other objects of the invention include the provision of a terminal having the foregoing features and that is compact, relatively low in cost, and can be fabricated with presently-available commercial components.

The objects of the invention also include the provision of data processing methods for attaining a terminal having the foregoing features.

Other objects of the invention will in part be obvious and will in part appear hereinafter.

GENERAL DESCRIPTION

A terminal according to the invention has a multiple-character display element and a keyboard with a full complement of alphanumeric character keys, much like a typewriter, in addition to various control keys. The terminal can establish communication with a remote host computer, commonly by way of telephone lines, and relay messages between the user of the terminal and the host.

One features of the terminal concerns the management of displayed characters. This feature includes presenting a split-screen display in which a message from the host appears starting at one location on the display element, whereas a message from the user appears starting at a different location. When the user enters a message at a time when a host message is being displayed, the terminal retains the host message, or so much of it as the display element can accommodate, together with the user message. In particular, the terminal continues to display the host message together with the characters the user is entering. When there is no room on the display to accommodate both the existing host message and the message which the user is entering, the terminal automatically removes the host message from the display on the same basis, e.g. character-by-character, as it enters the user message.

Another display management feature of the terminal is that a message from the host apparatus essentially instantaneously, that is it seemingly pops onto the display element. However, where the message is too large for the display element to handle at one time, the terminal pops an initial portion of the message onto the display and then automatically commences scrolling, to display the rest of the message. The terminal thus selectively combines both pop and scroll display formats.

The terminal provides the foregoing display management features even when the display element has only a single-line display of limited capacity. In this instance, the host message starts, for example, at the left side of the single-line display, and the user message starts at the right side of the display line. As the user keys in additional characters, the terminal scrolls the user message to the left to add the new characters at the right end of the display line. This scrolling entry of a user message normally does not disturb the display of the host or other previously-displayed message, at the left side of the display line. However, when the user message has scrolled left to such an extent that it encounters the message at the left side of the display line, the terminal scrolls the entire display to the left as new characters are added. Characters at the left end of the display are then in effect pushed off the display.

The display management feature of the terminal additionally includes a variable scroll rate which the user can change at will. Further, the user can stop and then restart the presentation of new information on the display element. The terminal provides these user controls of the display without loss of characters from the host.

A feature related to the foregoing display management concerns kinetic punctuation to convey message information and operating reports to the user with both visual and audible signals for enhanced intelligibility. One element of this feature is the selective blinking of one or more displayed characters. By way of example, a terminal embodying this feature can blink or flash a question mark at the end of a host inquiry to the user. This and other instances of one of more blinking characters inform the user that the terminal, or the host computer with which it is connected, is awaiting a response or other entry from the user.

The kinetic punctation which the invention provides further includes introducing inter-character spaces into the scroll display of a message for providing punctuation-simulating pauses in the displayed message. A terminal embodying this feature thus scrolls a message on the display element with pauses, i.e. additional time between certain message words, in much the same manner that person-to-person dialogue includes pauses coincident with punctuation. The terminal can pause the scroll display both upon command from the host and simply in response to interpretation of a stream of display characters from the host. A preferred embodiment provides punctuation pauses of different lengths according to the message context and according to the scroll rate, which as noted is user selectable.

A further element of kinetic punctuation is an extensive set of inter-related sound cues which the terminal generates in response to various operations. Many of these operations respond to user operation of the keyboard. The terminal thus responds to user selection of an alphanumeric key with an informative tone or set of tones. The terminal further responds to the selection of different control keys with other audible reports, each generally unique to the specific control function. Many control-responsive audible tones are related to one another according to the relation between the control keys which initiate them. An elementary example is that the terminal acknowledges a NO control key with a sound cue that bears a readily-discernible relation to the cue which it produces in response to a YES key. A terminal according to the invention similarly produces a sound cue when it enters the on-line condition with a data processing system and produces a different but related cue to announce that it is good off line, or disconnecting from the data processing system.

These and other kinetic punctuation elements communicate to the user both with sound and with sight the stream of information coming to the terminal from the host as well as the terminal response to actuation of the terminal keys by the user.

Yet another feature of a terminal according to the invention is the provision of control keys and resulting functions that both provide relatively sophisticated operation for an experienced user, and yet provide almost natural interaction of an inexperienced user with the terminal. In accordance with this feature a terminal provides the user with such elementary control keys as NO, YES and ENTER; in addition to keys that report such natural responses as DON'T KNOW and HELP. There are further control keys for inputting instructions such as REPEAT, GO BACK, BACKSPACE and CLEAR ENTRY. These various control keys are of significant aid to an inexperienced user. Moreover, an experienced user can use these and additional control keys to attain enhanced communication with the host system.

A terminal according to the invention provides yet another feature, which is automatic repertory dialing directly onto a telephone line. The terminal provides all the functions for this operation and hence does not require a telephone, an acoustic coupler, a separate dialing device, or a separate store of automatically dialable telephone numbers. The dialer feature can provide either repertory dialing of a number from a stored catalog of numbers or dialing of a number which the user enters by way of the keyboard. Another element of the dialer feature according to the invention is that the terminal automatically monitors the telephone line to communicate to the user any desired ones of the usually encountered telephone sounds, i.e. dial tone, dialing pulses, ringing signal, and busy signal. Yet the invention provides this dialer function with significant flexibility such that, where desirable, the terminal can be connected with a conventional telephone and placed on line with a host by dialing through the telephone instrument, rather than the terminal.

These and other features which will become apparent from the following discussion provide a keyboard and display terminal capable of unusually compact and low cost construction. Yet even when the terminal has a display element of limited capacity, it presents both messages and status information to the user in a readily comprehensible manner. By way of example, the invention makes possible a readily usable terminal having a display element with only a single line, sixteen-character capacity. It is understood that prior efforts to provide a terminal with such a limited display have been unsatisfactory, due to incomprehensibility of the displayed information.

The features moreover enable a user having minimal experience to communicate with a data processing host. Similarly, a person of limited intelligence or education or even a person with a learning handicap, learning disability or impaired perception can, by way of a terminal embodying the invention, successfully communicate with a data processing system or with another person using a similar terminal. A specific example is that at least some persons with speech or hearing impairments that render them unable to use conventional telephones will be able to communicate by using a terminal embodying this invention.

The invention accordingly comprises the several steps and the relation of one or more of such steps with respect to each of the others, and the apparatus embodying features of construction, combinations of elements, and arrangements of parts adapted to effect such steps, all as exemplified in the following detailed disclosure, and the scope of the invention is indicated in the claims.

For a fuller understanding of the nature and objects of the invention, reference should be made to the following detailed description, and the accompanying drawings in which:

FIGS. 5-1 through 5-21 are flow charts and other diagrams illustrating operation of a terminal according to the invention; and FIGS. 6-1 through 6-7 are flow charts and other diagrams illustrating display management operation according to the invention.

DESCRIPTION OF ILLUSTRATED EMBODIMENT

Figure 1:
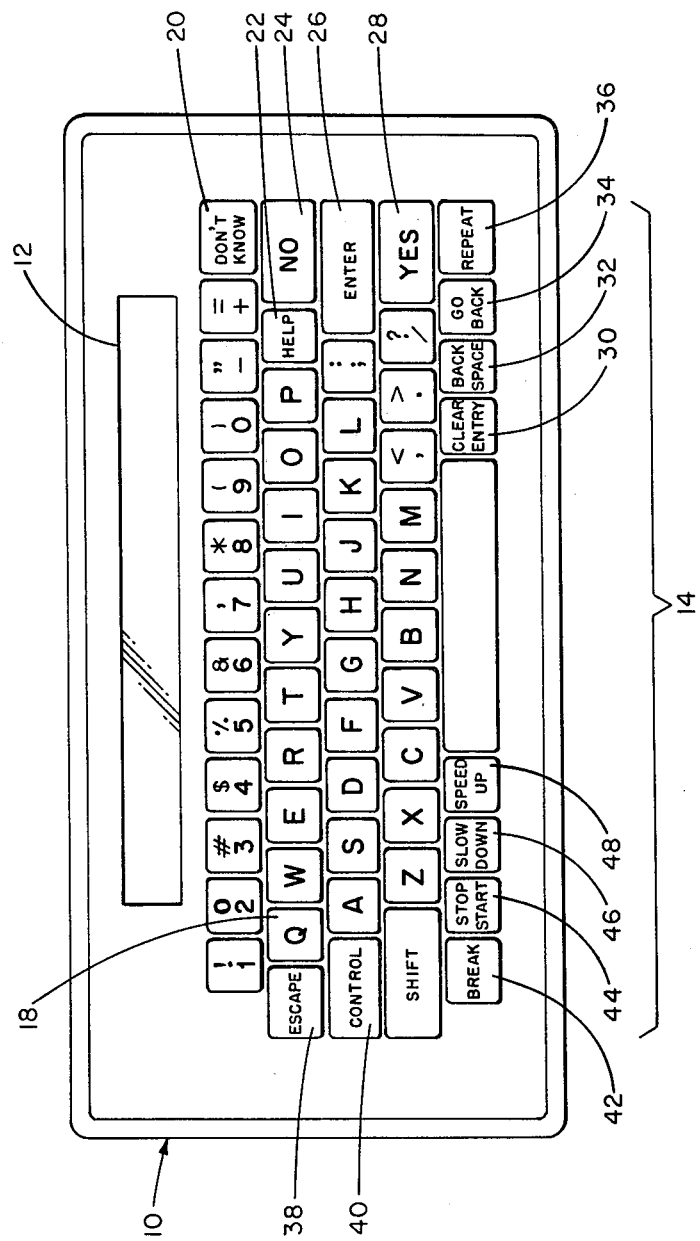
FIG. 1 shows the keyboard and the display of a terminal embodying features of the invention.

A terminal according to the invention provides management of displayed information in a manner that is advantageous with displays having various formats and capacities. But the feature is of particular value in a terminal having a display of limited characters. One element of the display management feature concerns the selective use of display formats termed pop and scroll, and another concerns a split screen display. These and other display management features are described with particular reference to a terminal having a display element of limited capacity, specifically a single line of sixteen characters.

According to the pop display format, the terminal enters the characters of a message on the display element in timed succession, and enters successive characters from left to right across the display, similar to the entry of characters with a typewriter and starting from the left end of the display, i.e. the display is left justified. Although the characters enter in succession at the rate they are received, the rate typically is so fast that the message appears to be presented essentially instantaneously.

The illustrated scroll display format moves characters already being displayed to the right across the display element and enters new characters at the right end of the display.

When a terminal according to the invention is operating with the pop format, it automatically switches to the scroll format when the display element becomes full of characters. The terminal then adds further characters of the message at the right end of the display element, as it scrolls the message to the left, dropping characters from the left end.

To illustrate these features, consider an operating sequence typical when a terminal according to the invention first goes on line with a host computer. According to a further feature of the invention, the host computer recognizes the specific terminal in such a way that it greets the user by means and hence sends the terminal the following message:

HI ROBERT! ENTER PASSWORD.

This message exceeds the sixteen-character capacity of the display element. The terminal accordingly presents by pop display the first sixteen characters, i.e. the terminal first displays with the pop format.

HI ROBERT! ENTER

The terminal determines that the message it has so far displayed with the pop format fills the display element. The terminal accordingly reverts to the scroll format and enters the rest of the message with the following steps:

I ROBERT! ENTER
ROBERT! ENTER P
OBERT! ENTER PA

The terminal continues operating in the scroll format until it has entered the remaining portion of the message, at which point the display element shows

ENTER PASSWORD.

The foregoing example displayed only host messages. Consider next the operation when the user responds by entering the password "Friday". As detailed hereinafter, the terminal responds to the commencement of a user message, i.e. entered by way of the keyboard of the terminal, by automatically entering the scroll format of display. Further, it typically retains the host message to the extent there is capacity for it on the display element. The terminal thereby provides the above-mentioned split screen operation. More particularly, continuing with the foregoing example, when the user types the first letter of the password Friday, the terminal scrolls it in to yield the following display:

NTER PASSWORD. F

As the user continues typing in the password, the display changes as follows:

TER PASSWORD. FR
ER PASSWORD. FRI . . .
PASSWORD. FRIDAY

One effect of this display management is that the terminal continues to display to the user the last request or other message from the host, together with the user's response, until the response fills the entire display. Thus, if the user is interrupted or distracted while entering a response, the display of the remaining portion of the host inquiry readily reminds the user what task the terminal is calling for.

It is also an element of this display management feature that the terminal provides the foregoing pop-scroll formats with only two variables. One variable identifies whether the terminal is operating in the pop mode or in the scroll mode, and the other variable identifies the location of the display pointer on the display element.

A terminal according to the invention further has scroll-controlling keys which are operative during the scroll format of display. These are a single START/STOP key, a SLOW DOWN key, and a SPEED UP key. The SPEED UP and the SLOW DOWN keys control the scroll rate, which in an illustrative terminal has a range of from two to thirty characters per second, in sixteen intervals. Either key may be depressed momentarily, which causes one step change in speed. Holding one of these keys down causes the rate to change every 0.3 seconds, which is similar to an automatic repeat key of an electric typewriter. Further, each time the scroll rate changes, the terminal preferably issues an audio signal, i.e. a sound cue. When the user speeds up the scroll rate the sound cue correspondingly increases in frequency, and vice-versa. Once the scroll rate has reached its maximum or minimum value, the terminal no longer issues a cue if the user tries to exceed those limits.

The START/STOP control key toggles the scrolling display movement on and off. When the display is stopped in this manner, a preferred embodiment of the terminal produces a timer-like ticking sound to continually remind the user that the terminal has been placed in this stopped condition. The invention attains the foregoing selective controls of the scroll without loss of characters which it meanwhile is receiving from the host.

Still another aspect of the display management feature of this invention becomes apparent when a user depresses either of two further control keys on the keyboard, i.e. a BACKSPACE key, or a CLEAR ENTRY key. To illustrate this, consider the prior example where the user is typing in the password FRIDAY in response to a host message to ENTER password. In the event the user makes a mistake in typing in the desired password FRIDAY, this can simply be corrected by depressing either the BACKSPACE control key or the NO control key. In this instance, the response to the terminal to either control key is the same. The terminal deletes the last character which the user entered and shifts by one character to the right that portion of the displayed message which the user originated. Whatever portion of the prior host message is on the display screen remains undisturbed. In response to the CLEAR ENTRY control key in this instance, as may occur when the user has typed in an incorrect password and wishes to delete it, the terminal deletes the entire user response but again leaves undisturbed whatever portion of a host message which is being displayed. These, thus, are two further instances of the split screen operation which a terminal according to the invention provides. These features greatly facilitate the user in responding to host messages and, in general, in entering messages via the terminal.

As previously noted, a terminal according to the invention also provides kinetic punctuation, one element of which inserts a pause-simulating space in the display of a message when operating with the scroll format of display. Kinetic punctuation also provides for the blinking or flashing display of one or more selected characters. In addition to these visual cues, kinetic punctuation provides the user with audible sound cues.

A terminal according to the invention provides each form of kinetic punctuation both in response to host instructions and in response to analysis of operation within the terminal itself. The pause punctuation significantly aids user comprehension of the scroll display of a message. The effect is simply to halt or stop the display of further characters for a brief pause interval. It hence functions much as a pause which occurs in dialogue after a comma, a period, and other punctuation. The pause moreover is adjusted with the scroll speed as described above with reference to the SLOW DOWN and SPEED UP control keys. In addition, the embodiment described below provides different pause times for different punctuations, to enhance user comprehension of a display.

The blinking of a character also aids user comprehension of whatever message is being displayed. For example, when a host message requests information and is followed by a question mark, the blinking display of the question mark reinforces the user comprehension that a response is needed.

The tone cues which a terminal according to the invention provides can respond to host commands, to the interpretation within the terminal of certain host messages, to user operation of the various keys on the keyboard, and to signals the terminal is receiving from a telephone line. In particular, a terminal embodying the invention produces a specific tone in response to the receipt of a host command identifying the ASCII BEL character. Further, the receipt of a question mark character produces a unique cue and the receipt of certain punctuation characters from the host produces other different cues. The terminal also responds to display characters from the host to produce different sound cues depending on the character. The terminal in addition responds to actuation of keyboard keys with other tone cues, thereby providing key-characterizing feedback to the user.

By way of specific example, a terminal embodying the invention has the following keys and produces a unique or control-characterizing sound cue in response to each one YES, NO, REPEAT, ENTER, GO BACK, HELP, DON'T KNOW, BACKSPACE, CLEAR ENTRY, BREAK, SPEED UP, SLOW DOWN, START/STOP. The terminal further produces unique sound cues when it goes on line, i.e. establishes communication with a host, and when it goes off line, i.e. loses or otherwise discontinues communication with a host.

The tone cues in the illustrated terminal can be of four types. One type of tone cue is a single beep, which can, however, have a specified pitch and duration. Another type of sound is an arpeggiation, i.e. a sequence of ascending or descending tones. The arpeggiation can have a different specified starting pitch, a specified interval between pitches, and a specified end pitch, in addition to either a fixed or adjustable duration of each pitch. A third type of sound which a terminal embodying the invention can provide is a trill, i.e. an alternation between two pitches. The terminal provides a trill with a selected low pitch and a selected high pitch and a selected rate of change between the pitches, and again the length of each note in the trill and the number of alternations, i.e. the total length of the trill can also be variables. A fourth type of sound cue is a three-tone sequence. Here each pitch can be specified and the duration of each pitch, as well as the interval between pitches, can either be fixed or where desired be additional variables.

The sound cues which a terminal produces in response to telephone line signals communicate to the user the status of the terminal operation when it is dialing a telephone number. These tone cues give the user essentially the same kind of information with which a person is familiar in every day use of the telephone. That is, the terminal produces perceptibly different sound cues in response to any one or more of the following, as deemed useful to the user: a dial tone on the telephone line, the dialing operation by the terminal, the ringing operation of the telephone network, and a busy signal.

A terminal embodying these and other features disclosed herein can be constructed with present-day components to be truly hand and pocket portable and yet comply with present-day FCC requirements and with the protocols, code conventions and like parameters of present-day computer networks. The terminal moreover is easy to use even with minimal training or skill. The use is further characterized by relatively low user error, by low user fatigue, and by relatively high speed formating and communication of both user and host messages. The split screen display with pop and scroll formats greatly facilitates the small size and relatively low cost of the terminal by making communication possible with only a limited capacity display element. Moreover, this display management can convey significantly more information than many known display formats.

Still another advantage which the invention brings to a terminal is the automatic dialing of telephone numbers, without any additional equipment, i.e. without the use of a telephone, a separate dialer, a separate acoustic coupler, or a separate memory to store a repertory of telephone numbers. A compact terminal embodying the invention can provide the operation which previously required all of these additional separate devices.

By way of specific example, a terminal according to the invention and with a front panel as shown in FIG. 1 is housed in a case which measures approximately three inches by six inches by one inch, excluding the power supply when batteries are not used. This terminal has a sixteen character alphanumeric display and a fifty-nine key keyboard organized in conventional typewriter format. In addition to providing the tone cues and kinetic punctuation described, the terminal provides automatic pulse dialing for telephone numbers which it stores. Further, the user can change any of the stored numbers or can manually dial a different number. A blinking cursor follows each character of a telephone number on the display as it is being dialed, and telephone-line responsive tones are produced until the terminal becomes on line with the host system.

The terminal has a variety of keys which implement frequently-used user control operations via a single-button response, and it displays a user message with echoplex transmission to give the user visual verification that the user-keyed character has in fact been transmitted to the host and returned to the terminal without error. The terminal provides the foregoing features, together with the pop and scroll display modes and split screen display management features previously described.

Figure 2:
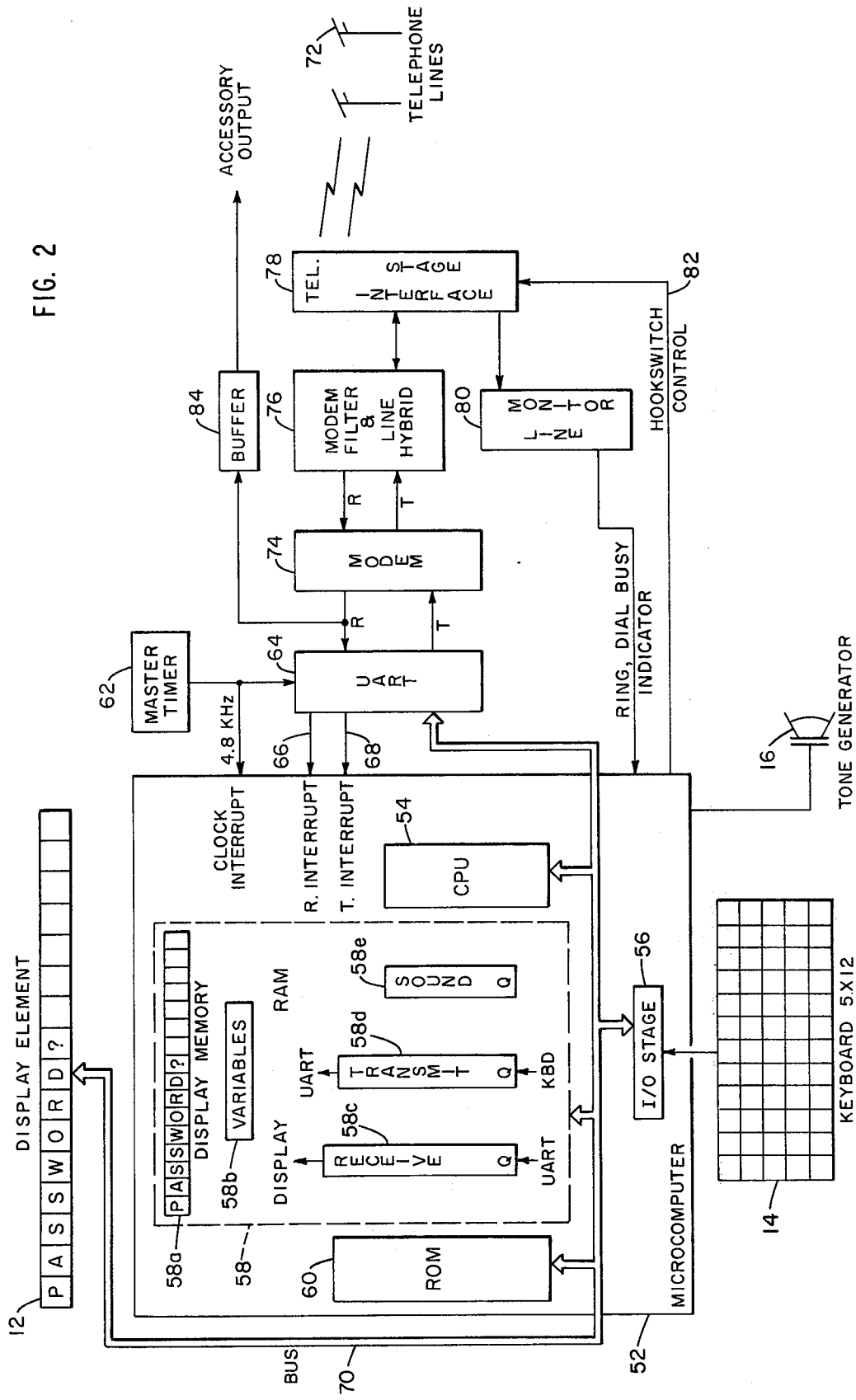
FIG. 2 is a hardware block diagram of a terminal embodying features of the invention.
Figure 3C:
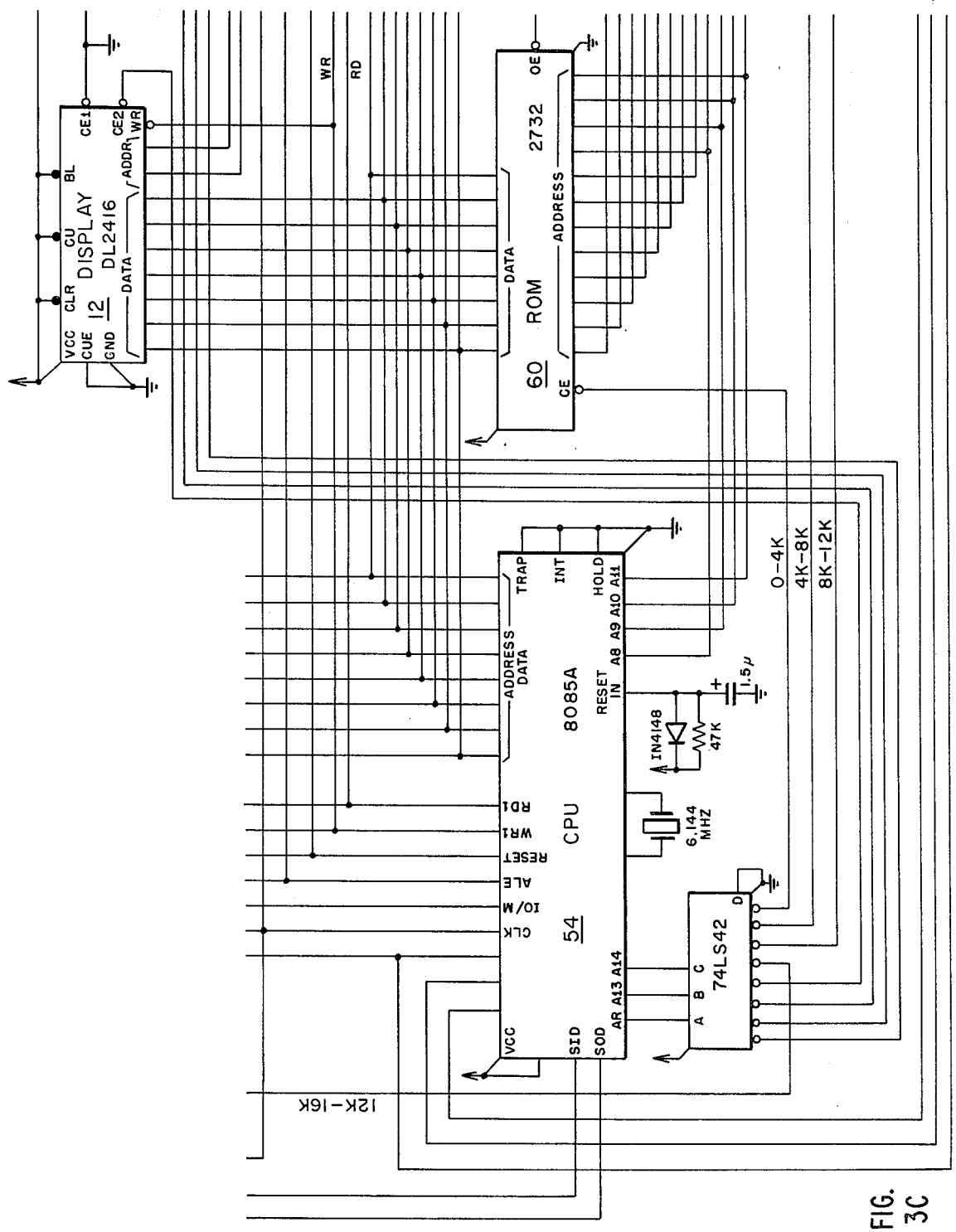
FIG. 3 is a detailed schematic diagram of the terminal of FIG. 2.
Figure 3D:
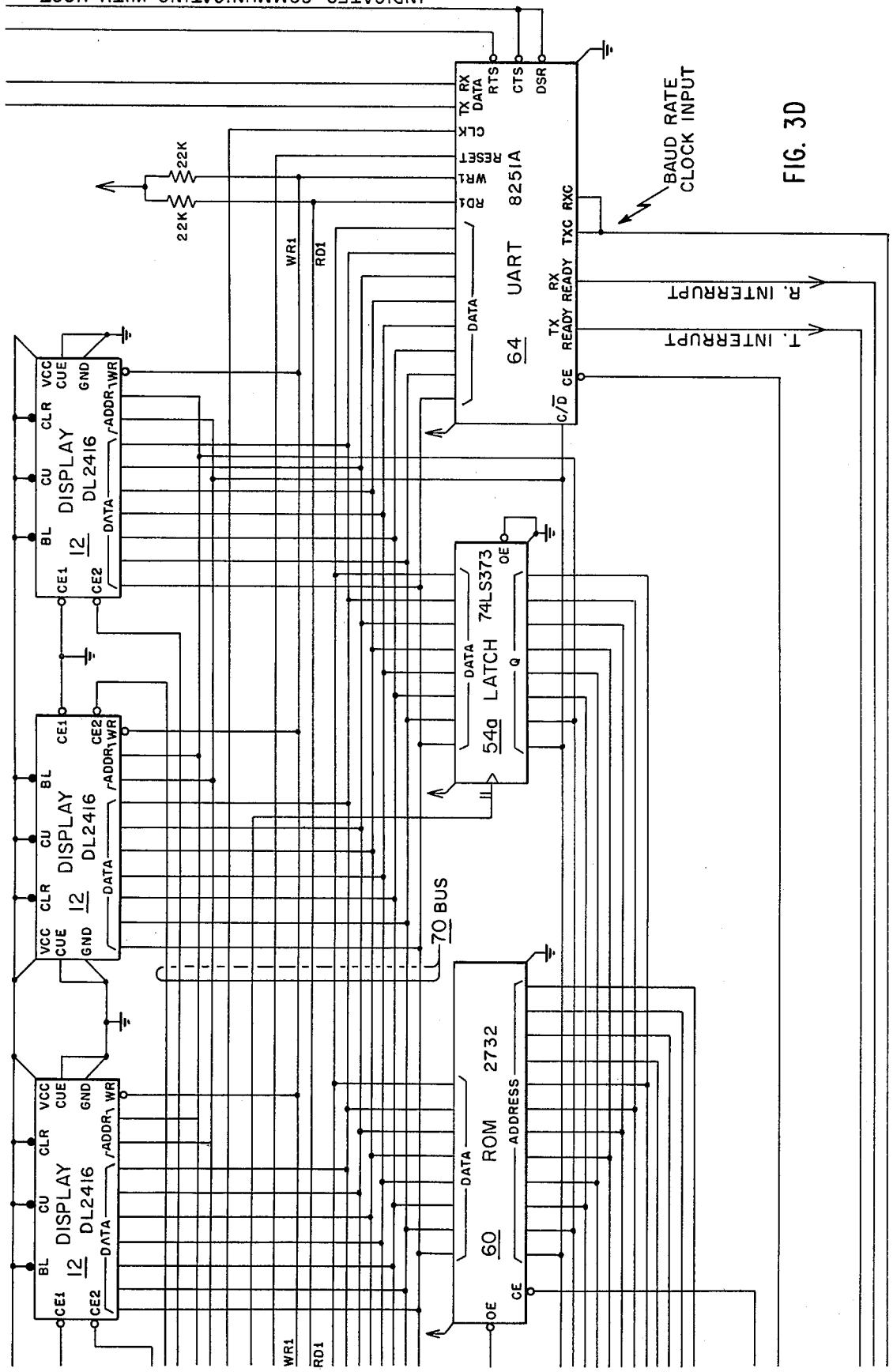

A terminal 10 embodying the invention has, as shown in FIG. 1, an alphanumeric character display element 12 and a keyboard 14. These elements, in addition to an acoustic speaker 16 shown in FIG. 2, provide communication between the terminal and the user. The display element 12 is of limited capacity. The illustrated element provides only a single line display of not more than sixteen characters. The keyboard 14 provides a full complement of alphanumeric characters 18 in the conventional QWERTY format. The illustrated terminal 10 in addition has the following complement of control keys: DON'T KNOW 20, HELP 22, NO 24, ENTER 26, YES 28, CLEAR ENTRY 30, BACKSPACE 32, GO BACK 34, and REPEAT 36, all located on the right side of the keyboard as illustrated. Additional control keys designated ESCAPE 38, CONTROL 40, BREAK 42, STOP/START 44, SLOW DOWN 46, and SPEED UP 48, are provided on the left side of the illustrated keyboard.

The user enters information into the terminal 10 by typing on these keys of the keyboard 14. The illustrated terminal displays a character in response to an acknowledge or echo signal from the host, rather than in response to the user keying the character. Thus, as described further hereinafter, it is the echo of the keyed characters which the terminal displays by scrolling in from the right side of the illustrated display element 12. To maximize display information content, the message previously presented on the display element 12, which generally is a host message, remains stationary on the display element as the user response scrolls leftward across the display element until the first character of the user response bumps into the last character of the host or other previously entered message being displayed. At this point, the entire display is scrolled left on the display element 12.

As FIG. 1 shows the entire terminal is housed in a hand-portable pocket-sized case.

The following are the different user responses which the illustrated control keys initiate. The description includes the ASCII (American Standard Code for Information Interchange) identification of each response.

An alphanumeric string followed by ENTER or YES: Each alphanumeric entry sounds a 2400 Hz beep as feedback for key depression. The user can change alphanumeric entries with the BACKSPACE and CLEAR ENTRY keys. An alphanumeric user response is terminated by ENTER or YES. The changes must occur before the response is terminated.

ENTER sends the standard carriage return <CR> that is the conventional user response terminator.

BACKSPACE deletes the previous alphanumeric character and shifts the user response one character to the right.

CLEAR ENTRY deletes the entire user response.

YES causes the sequence Y <CR> to be sent. The user is responding yes to the host message. If the user types any alphanumeric keys before entering YES, the terminal 10 just sends out <CR>.

NO causes the sequence N <CR> to be sent. The user is responding no to the host message. If the user types any alphanumeric keys and then enters NO, the terminal 10 assumes the user is thinking "no I didn't mean to enter the last character" and sends out the CLEAR CHAR character to delete the previous character. CLEAR CHAR is sent each time NO is pressed until there are no more characters to delete. A following NO would cause the N <CR> sequence. Note that the terminal thus imposes a conditional interpretation on both the YES and NO keys.

REPEAT causes the sequence — (underline) <CR> to be sent. The user is responding "will you please repeat the last host message".

GO BACK causes the sequence ∧ (up arrow) <CR> to be sent. The user is responding "show me the previous host message so I can change my last user response".

HELP or DON'T KNOW keys cause the sequence ? <CR> to be sent. The user is responding "I don't know what to answer" or "I'm lost" or "I don't understand".

Note that the character code sequences of the above special keys, i.e. YES, NO, REPEAT, GO BACK, HELP, DON'T KNOW, require a cooperating host computer which understands, i.e. recognizes, these special code sequences and takes appropriate action. These special key character code sequences are outside of, but not in conflict with American National Standard Institute X 3.28.

ESCAPE causes the ASCII ESCape character to be sent. The user is responding "I do not want to see the rest of this host message".

BREAK causes the ASCII DLE to be sent. The user is responding "I no longer want to follow this dialogue". If the user presses the BREAK key twice within two seconds, the terminal 10 displays "DISCONNECT?" allowing the user to disconnect locally. If the user then presses YES, the terminal 10 hangs up, issues the offline sound, and returns to Offline Mode. Pressing any other key causes the terminal 10 to issue the REPEAT key sequence so the user can see the host message lost when "DISCONNECT?" was displayed.

FIG. 2 is a hardware block diagram of the terminal 10 and shows the display element 12, keyboard 14 and tone generator 16 connected to a microcomputer 52. The microcomputer has a central processing unit 54, an I/O stage 56, a random access memory (RAM) 58, and a read-only memory (ROM) 60. As indicated the RAM 58 includes a display memory 58a, a variables register 58b, a receive queue 58c, a transmit queue 58d, and a sound queue 58e. The terminal also has a master timer 62 connected with the microcomputer 52 and with a universal asynchronous receiver transmitter (UART) 64. The UART connects with the microcomputer 52 by way of a receiver interrupt line 66, a transmit interrupt line 68, and a bus 70 which as shown interconnects the elements of the microcomputer and also the display element 12.

The UART 64 couples signals between the microcomputer 52 and a communication path illustrated as employing telephone lines 72, successively by way of a modem 74, a modem filter and line hybrid stage 76, and telephone interface stage 78. These interconnections include two-way signal paths, as shown. In addition, a line monitor 80 receives input signals from the interface stage 78 and, in response, applies output signals to the microcomputer 52. The interface stage 78 further is connected directly with the microcomputer 52 by way of a hookswitch control line 82. The illustrated terminal 10 also has a buffer 84 to provide an accessory output.

Figures 1, 5:
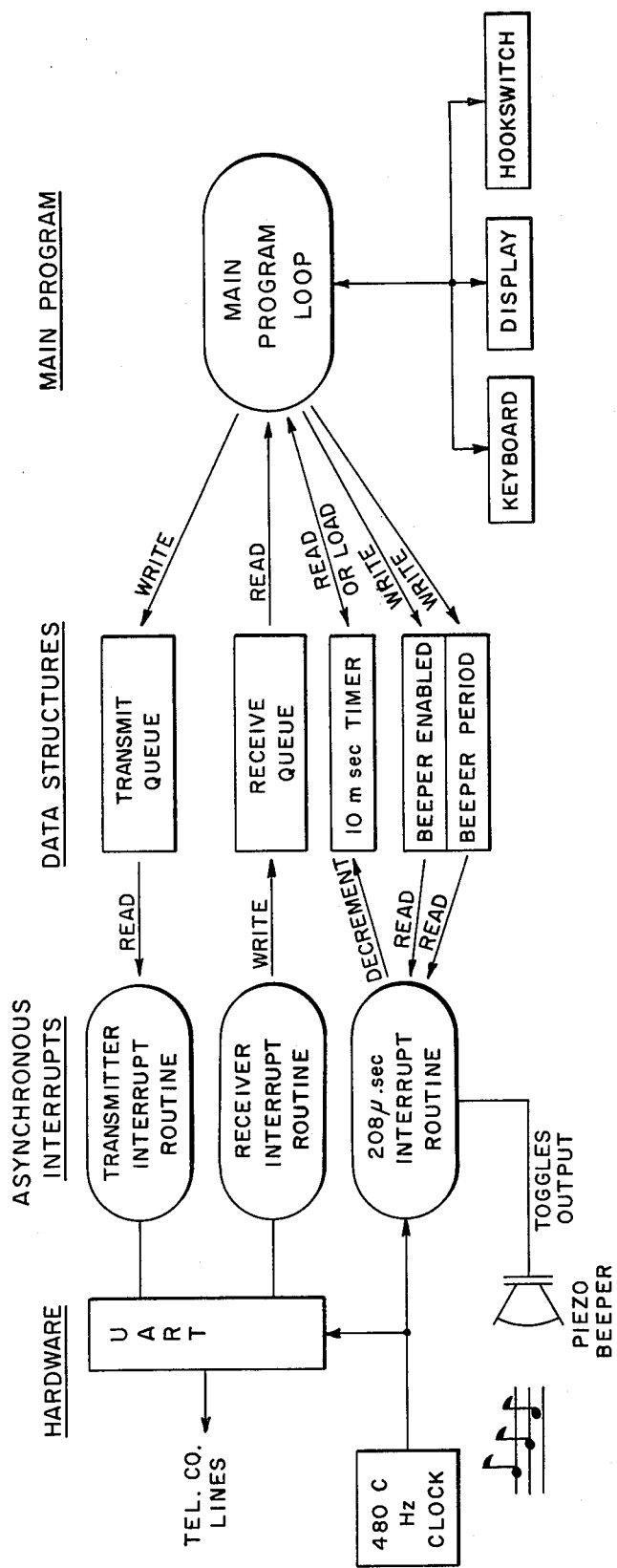
Figures 2, 5:
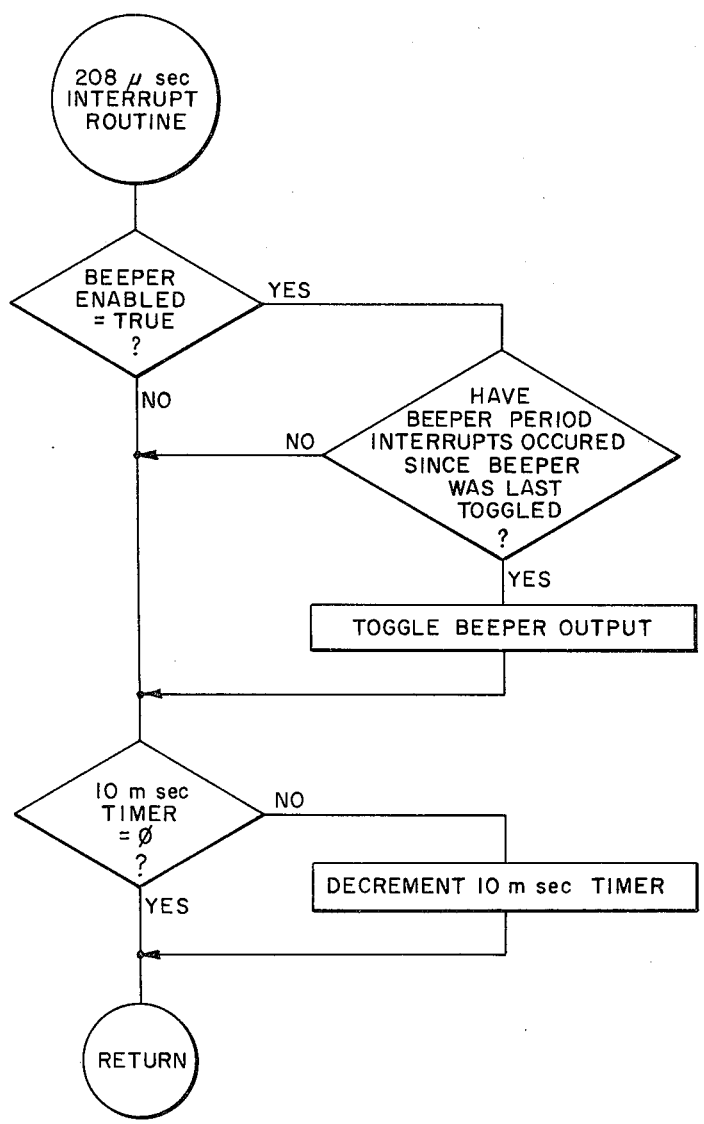
Figures 3, 5:
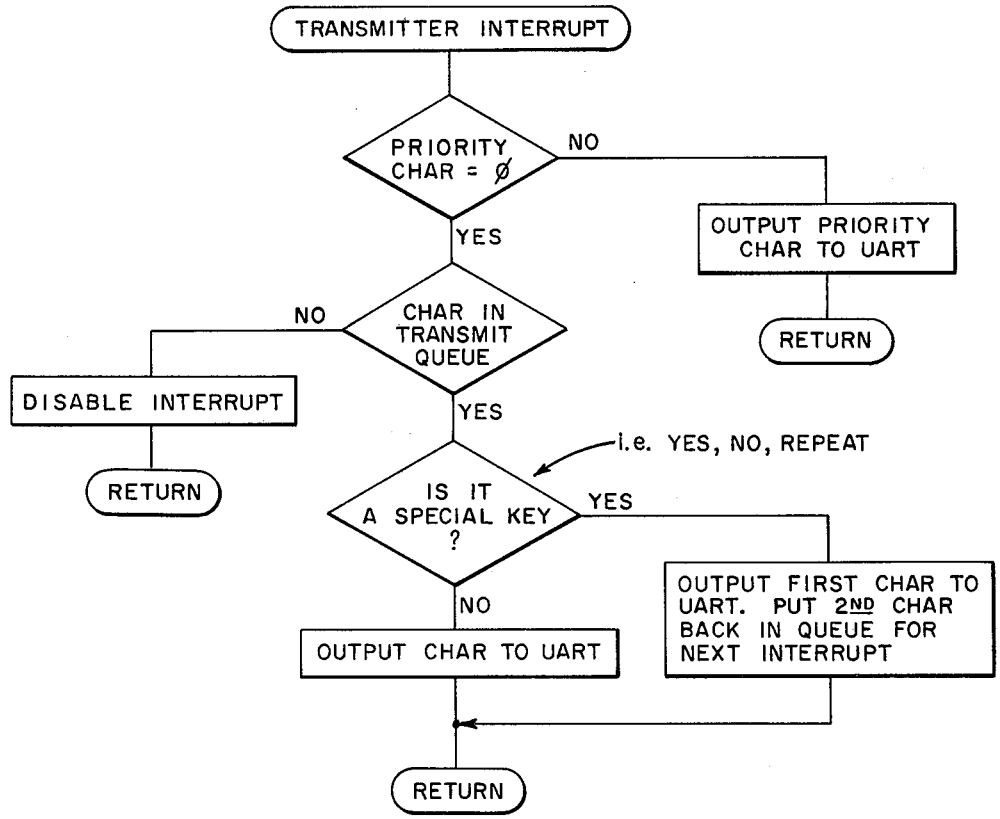
Figures 4, 5:
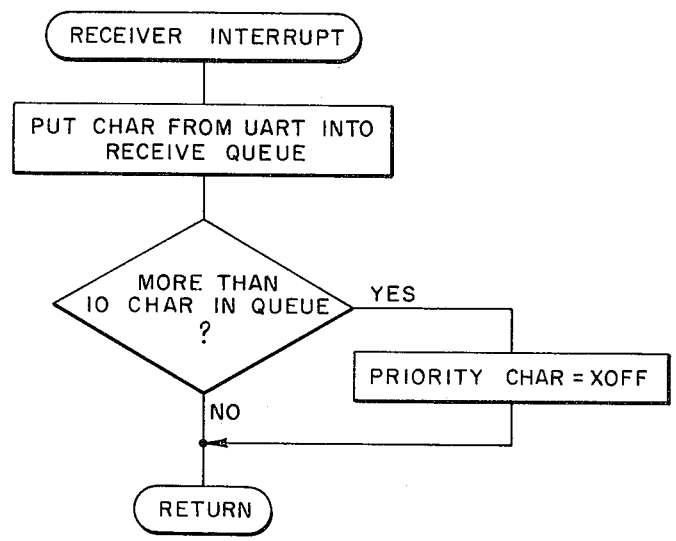
Figure 5:
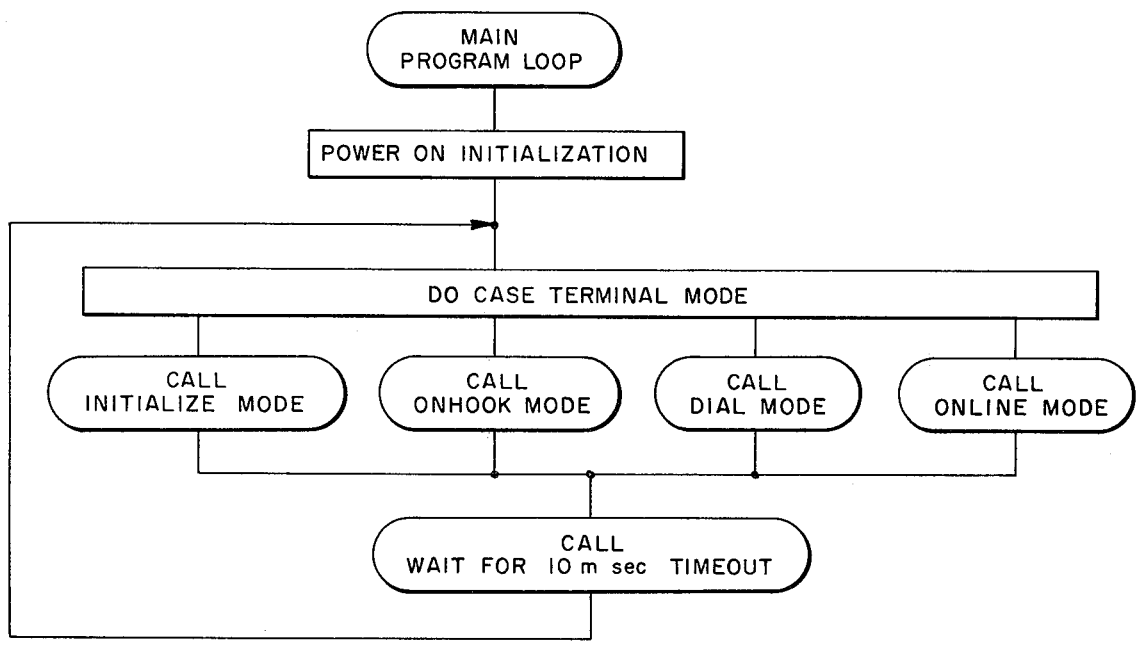

FIG. 3 shows a detailed schematic diagram of one specific embodiment of a terminal 10 according to FIGS. 1 and 2. The illustrated terminal is assembled of commercially-available components as shown. In particular, the central processing unit 54 employs a commercially-available 8085A CPU and a 74LS42 address decoder connected in the manner shown. A 74LS373 address latch 54a is used to interface CPU 54 with the ROM 60. The I/O stage 56, RAM 58, and master timer 62 are an Intel 8155 integrated circuit connected in the manner shown. Two Intel programmable ROM units 2732 form the read-only memory 60 and the UART 64 employs an Intel 8251A unit. The display element 12 is formed with four Litronix display units DL2416. The illustrated display element thus has a limited number, e.g. sixteen, of discrete, character-displaying locations. FIG. 3 also shows the bus 70 and the interrupt lines 66 and 68 which interconnect the foregoing elements. As FIG. 3 also shows, the modem 74 employs a Motorola MC6860 modem, and the modem filter and line hybrid stage 68 employs Cermetek filters CH1262 and CH1267 connected with additional components in the manner shown. This circuitry in the filter and line hybrid stage 76, together with that shown for the interface stage 78a, which includes a hook switch relay 78 connected with the hook switch control 82, employ conventional practices well-known to those skilled in the art. The interface stage 78 is connected with telephone lines 72 in the manner indicated.

FIG. 3 further shows the circuit which forms the phone line monitor 80. The illustrated monitor circuit employs two stages of amplification to convert the telephone line signals it receives from the filter and hybrid stage 76 to a binary signal that is normally inactive but is switched to an active level for the duration of any telephone line signal, i.e. for the signal of the dial tone, the dialing signals, the ringing signal, and a busy signal. The phone line monitor is thus a form of envelope follower circuit.

FIG. 3 also shows at the top an illustrative power supply 86 for developing the +10 volt and +5 volt analogue source and +5 volt digital source for powering the components of the illustrated terminal.

Figure 4:
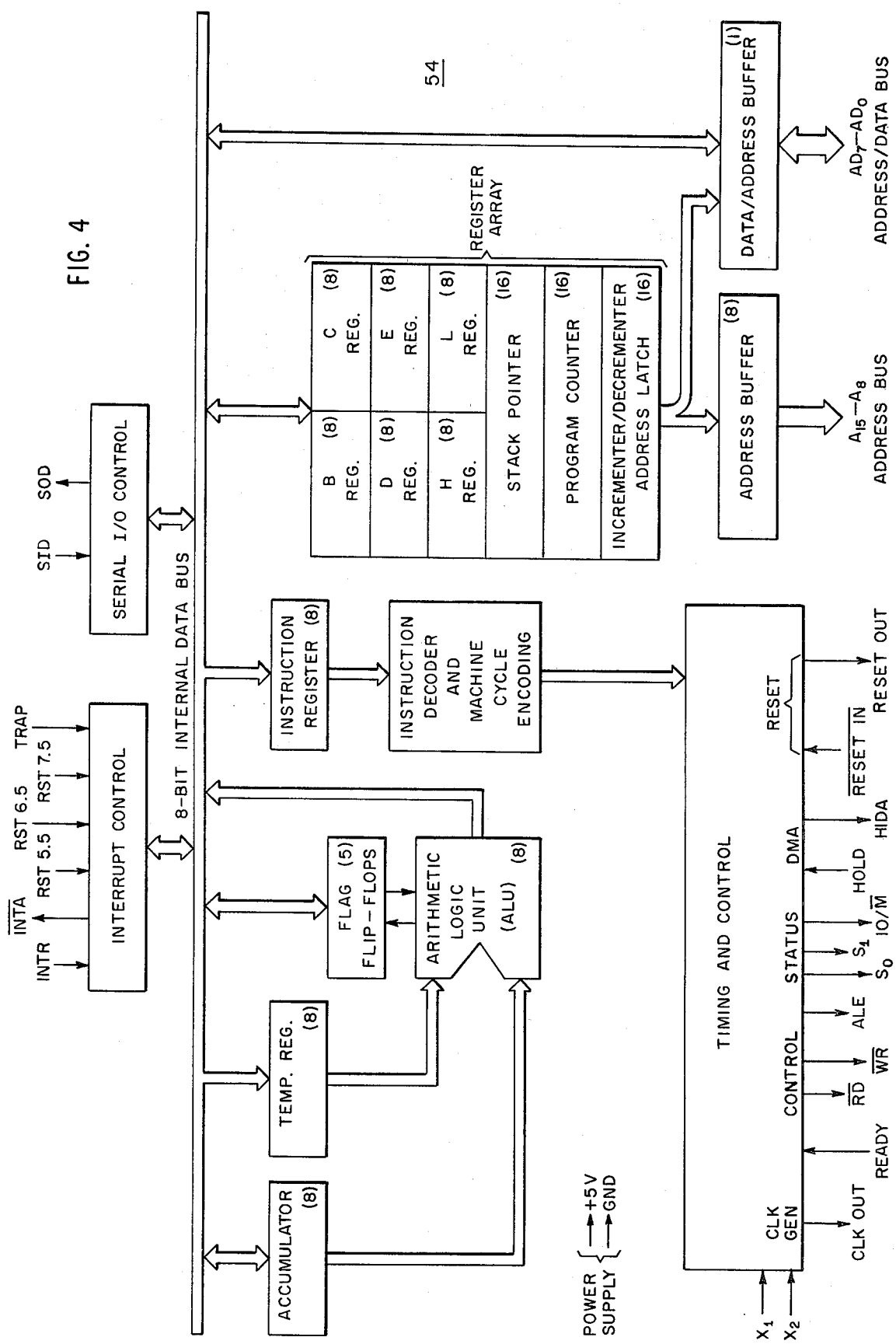
FIG. 4 is a functional block diagram of a microprocessor for use in the terminal of FIG. 3.

FIG. 4 is a functional block diagram of the 8085A central processing unit 54 in a form provided by one manufacturer, the Intel Company.

The telephone interface stage 78 ensures that the terminal 10 complies with FCC part 68 regulations and allows onhook, offhook and pulse dialing via a relay type hookswitch. A modular phone jack allows quick connection to the telephone network.

The line hybrid in the stage 76 separates transmit tones from incoming receive tones. It allows full duplex transmission and helps reduce possible errors caused by sidebands of the transmit tones that lie in the receive tone bandwidth. The modem filters of this stage further separate these two signals. The transmit filter also prevents higher order sidebands and overtones from entering the phone network (an FCC requirement). Besides eliminating transmit tones, the receive filter eliminates noise introduced by the phone system.

The phone line monitor 80 allows detection of dial, ring and busy signals on the phone line. The circuit responds to low frequency signals and produces a logic level for the microcomputer 52.

The modem 74 (MOdulator/DEModulator) converts digital data into tones transmitted by the telephone network. It recognizes and completes a BELL 103 type modem handshake with the remote computer's modem when the remote computer answers the phone.

The UART 64 (Universal Asynchronous Receiver Transmitter) converts parallel data into a serial bit stream. It inserts start, stop and parity bits to the serial bit stream forming an asynchronous communications format with vertical redundancy checking. The UART informs the microcomputer when a character from the host has been received and also signals when it is ready to transmit another character to the host.

The master timer 62 provides a square wave (4800 Hz) used by the UART 64 to establish the baud rate, and used by the microcomputer 52 as a reference for all timed operations (beep frequency, keyboard scan rate, display refresh rate, etc.).

The microcomputer 52, which is the control center of the terminal 10, includes the following firmware.

Master Clock Interrupt. The master clock interrupts the microcomputer every 208 microseconds. This interrupt causes the following operations. One is that the voltage applied to the piezoelectric beeper of the tone generator 16 is reversed if a sound is in progress and if half the period of the frequency being produced has elapsed. At a 208 microsec. interrupt rate, these voltage reversals let the terminal produce square wave frequencies of 2400 Hz and its subharmonics (1200,800,600, etc.). The other operation is that a timing register is decremented if its stores a number greater than zero. This register is initially loaded with the number 48 in the main program. Decrementing it every interrupt causes it to reach zero in ten milliseconds. Ten milliseconds is the least common multiple of all timed operations in the terminal 10 (i.e. keyboard scan rate, resolution of scroll rate, blink rate, etc.).

Received Character Interrupt. When the terminal has received a character from the host, i.e. over the telephone lines 72, the UART 64 interrupts the microprocessor 52. This causes the character to be read from the UART and placed in the microcomputer's receive queue register 58c.

Transmitter Ready Interrupt. The UART 64 interrupts the microcomputer 52 when it is ready to transmit a character (i.e. the previous one has been sent). This causes the microcomputer to see if there is a character to transmit in the transmit queue register 58d. If there is one, it is sent to the UART, if not, the microcomputer disables the UART transmitter interrupt mechanism until there is a character to transmit.

Receive Queue Register. The receive queue register 58c stores all characters sent from the host and gives them to the microterminal software when requested. Each character put in the queue by the UART 64 increases the queue length, while each chatacter taken by the terminal decreases its length. Since the scroll rate of the display element 12 is usually slower than the 30 char./sec. rate at which the host sends characters, the receive queue length increases faster than it decreases when the host sends long strings of characters to the terminal. To avoid the possibility of the queue "overflowing", the terminal 10 issues an ASCII DC3 (XOFF) character when it senses the length of the queue getting too long. The host must acknowledge by stopping transmission. When the queue length decreases the terminal issues an ASCII DC1 (XON) which signals the host to start transmitting again. The maximum length of the receive queue is a function of how long it takes the host to receive the ASCII DC3 (XOFF) character after the terminal transmits it. For example, if it took 0.5 seconds (possible over a satellite link), then at a 30 char./sec. transmission rate fifteen additional characters would be sent after the terminal issued the ASCII DC3 (XOFF). If the terminal allowed ten characters in its queue before sending the ASCII DC3 (XOFF), its maximum queue length would have to be twenty-five characters. The length of the receive queue in the illustrated terminal 10 is thirty-two characters.

Transmit Queue Register. The transmit queue register 58d is used to store characters the terminal will send to the host. Since the rate at which characters are sent is determined by the UART 64, using the transmit queue lessens the timing burden of the software. For example, when the terminal receives an ASCII ENQ character, the entire ID code is put in the queue using a few instructions. This ID code is typically stored in the ROM of the terminal. It preferably is not alterable. It serves as a unique, fingerprint-like identifier for each single terminal 10. That is, every terminal 10 preferably contains a unique ID code that includes a universal product code and a serial number. The software is then free to continue its program. The length of the transmit queue in the illustrated terminal 10 is eight characters.

Sound Queue Register. The sound queue register 58e is used to store different sound codes and allows the sound routine to play these sounds sequentially. For example, the user can press two keys before the sound for the first key has finished. Using the sound queue to store the sound codes for each key ensures each sound will play after the previous one finishes. The length of the sound queue in the illustrated terminal is four sound codes.

Display Memory. The display memory 58a stores the characters being displayed via the display element 12. The terminal uses the memory in order to examine the characters being displayed, as required for certain routines (dial, blink, split screen) and the terminal is able only to write into but not read from the illustrated display element. Each byte of the display memory contains the seven bit ASCII code for the character in the display element, plus one bit indicating if the character is to blink.

OPERATION

Figures 5, 6:
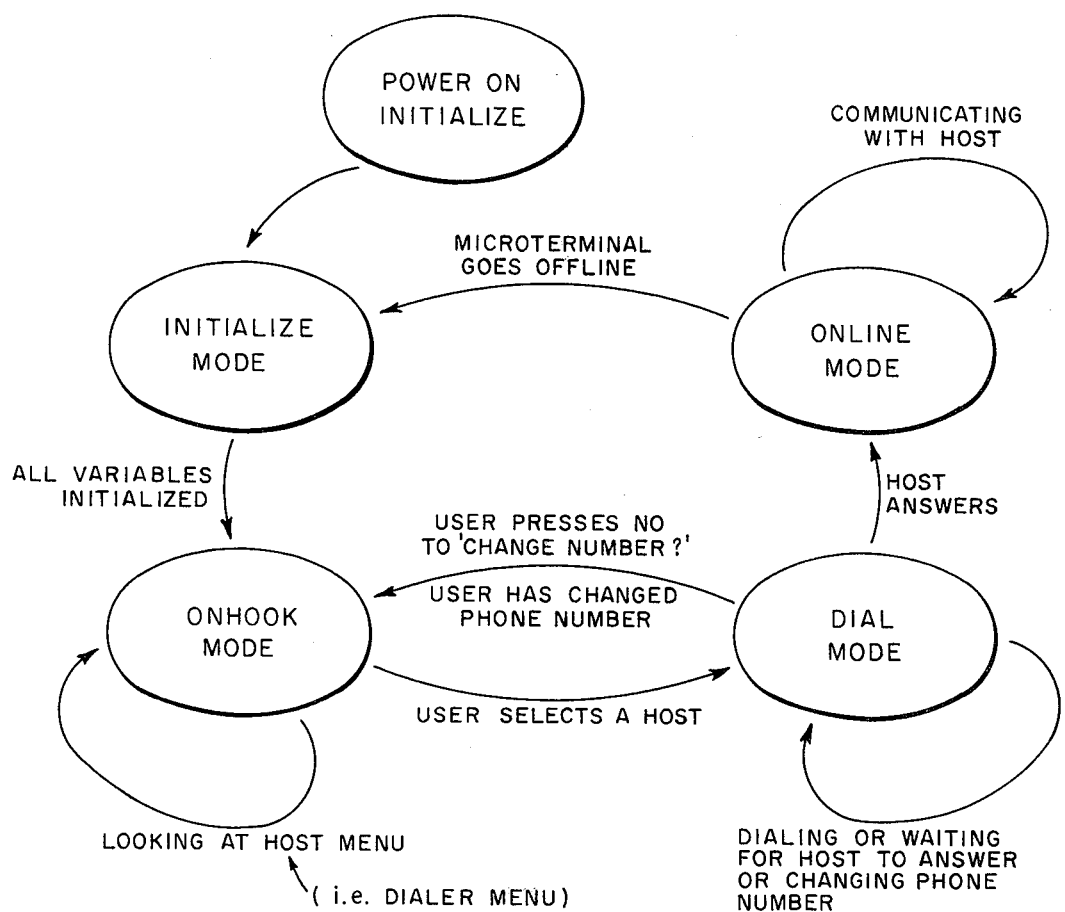

The operation of the terminal 10 is shown in the flow charts of FIGS. 5 and 6. The assembly language and high level (INTEL PL/M) language program listing for this operation have been filed concurrently with the application papers as Appendix I, Appendix II showing the operation code, in hexadecimal form, for this operation, and Appendix III is the list of variables for this program. The program listing of Appendix I includes annotations for reference with the flow charts of FIGS. 5 and 6. The flow charts and the appended program listing use the term microterminal in reference to the terminal 10 as described above with reference to FIGS. 1 through 4.

The chart of FIG. 5-1 shows that there are four asynchronous program events in the operation of the terminal 10. Three are interrupt routines and each communicates to the main program by way of the designated data structures, which are locations or registers provided in the random access memory 58 of FIG. 2. The three interrupt routines are a 208 microsecond timer interrupt routine, a transmitter interrupt routine, initiated when the UART 64 of FIG. 2 is ready to send a character to a host by way of the telephone lines and a receiver interrupt routine initiated when the UART has received a character from the host. The fourth program is the main program loop.

FIG. 5-2 shows the flow chart for the "208 microsecond interrupt" routine. The upper portion of the charted routine concerns operation for producing tone cues, the latter portion of the routine concerns a timing operation which decrements a ten millisecond timer except when the timer is at zero. This timer is used in numerous operations, one of which is to time the rate at which the keyboard keys are scanned; in particular, the scan rate is sufficiently slow to avoid detecting contact bounce abberations.

The flow chart of FIG. 5-3 concerns the "transmitter interrupt" routine of FIG. 5-1. This routine is used to disable the transmit interrupt from the UART, which occurs when there are no characters in the transmit queue of the RAM 58 (FIG. 2). Conversely, in the presence of characters the routine responds by an enable to send a character from the transmit queue to the UART. FIG. 5-4 shows the receiver interrupt routine of FIG. 5-1. The terminal 10 executes this routine when the UART has received a character from the host to process that character. Further, it signals the host to stop sending characters when more than a selected number of characters are in the receive queue (by sending an XOFF, i.e. ASCII DC3, character). The terminal 10 sends an XON, i.e. ASCII DC1, character to the host in the event the number of characters in the queue drops to less than a selected value. In the illustrated embodiment the XOFF character is sent when the queue has more than ten characters, and an XON is set when the queue contains less than five characters.

The main program loop of FIG. 5-1 is shown further in FIG. 5-5. This is the outermost level of the terminal 10 program. After an initialization operation, which occurs when power is first applied to the terminal, the program executes one loop every ten milliseconds and executes one of the four modes shown during each such loop. Each mode can accurately time its own operations because the terminal is premised on ten milliseconds elapsing during each execution of a loop. The flow charts following FIG. 5-5 show the sequence of operations for each of the modes shown in FIG. 5-5, i.e. for the terminal mode, for the initialized mode, for the onhook mode, for the dial mode, and for the on line mode; and subsequent flow charts in FIG. 5 diagram the wait for ten millisecond time out routine.

FIG. 5-6 shows the terminal mode state transitions which occur in the main program loop of FIG. 5-5.

When the terminal enters the onhook mode, which can also be termed an off line mode, it has been turned on and it is initialized and is waiting for the user to select a telephone number to dial. The illustrated embodiment provides the user with a host menu or dialer menu of numbers, and the user can choose from one of four such stored numbers or can enter a number manually. The manual selection is done using the YES, NO and GO BACK keys. During operation in this mode, by pressing the NO key, the user instructs the terminal to display from the dialer menu, the name of the next stored number. Pressing the GO BACK key shows the name of the previous number from the dialer menu. Actuating the YES key puts the identified number from the dialer menu into the display element and starts the dial mode. Further, the user can operate the CLEAR ENTRY and the BACKSPACE keys during entry of a number manually.

In the dial mode, the terminal goes offhook, i.e. connects to a phone line, waits for a dial tone, and then pulse dials the selected phone number. As each digit is dialed, the display of that digit is blinked to provide a visual queue for the user. After all digits have been dialed, the terminal monitors the phone line for ringing or busy signals, and produces a tone of similar duration for the user. When the modem establishes communication with the host at the selected number, the terminal 10 produces the tone queue reporting the on line condition and enters the on line mode. During or after dialing, while still in the dial mode, the user can hang up by pressing the NO key or can redial a selected number, for example when the line is busy or does not answer, by pressing the REPEAT key. If the user at this juncture presses the NO key, the terminal displays an inquiry, i.e. "CHANGE NUMBER?" which provides the user with the opportunity to change the stored number that was being dialed. If the user then presses YES, the terminal displays "ENTER NEW NUMBER" and accepts and stores digits which the user keys as follows. Up to sixteen characters can be entered. The BACKSPACE key deletes the last character entered, and the CLEAR ENTRY key clears all the characters entered. If NO or GO BACK are pressed, the terminal responds by displaying "ENTRY CANCELLED", does not change the stored phone number, and returns to the offhook mode. When YES or ENTER are pressed after the user has entered characters for the new telephone number, the illustrated terminal displays "THANK YOU", stores the new phone number, and returns to the offhook mode. When YES or ENTER are pressed before any characters are entered, the terminal again returns to the offhook mode.

With further reference to FIGS. 5-5 and 5-6, when in the on line mode, the illustrated terminal has established communication with a remote computer, i.e. a host. The dialogue created by the host is termed a "host message" and the reply which the user enters by way of the terminal keyboard is designated as a "user response". Characters which the user types are not directly entered in the display element. Instead, they are sent to the host computer, which then echoes them back to the terminal in accordance with the known echoplex technique. It is the echo which the terminal 10 displays. This operation provides a visual verification to the user that characters which the user entered by way of the keyboard have been sent, and received by the host.

The terminal 10 differentiates between characters of a host message and characters of a user response as follows. Pressing a key that sends a character to the host instructs the terminal to treat all received characters as echoes of a user response until the terminal receives a carriage return, break or escape character. All subsequent characters are then treated as a host message until the user once again presses a key which sends a character to the host. The differentiation allows the previously-described split screen display, where a user response can scroll across the display with the host message remaining stationary.

Figures 5, 6, 7:
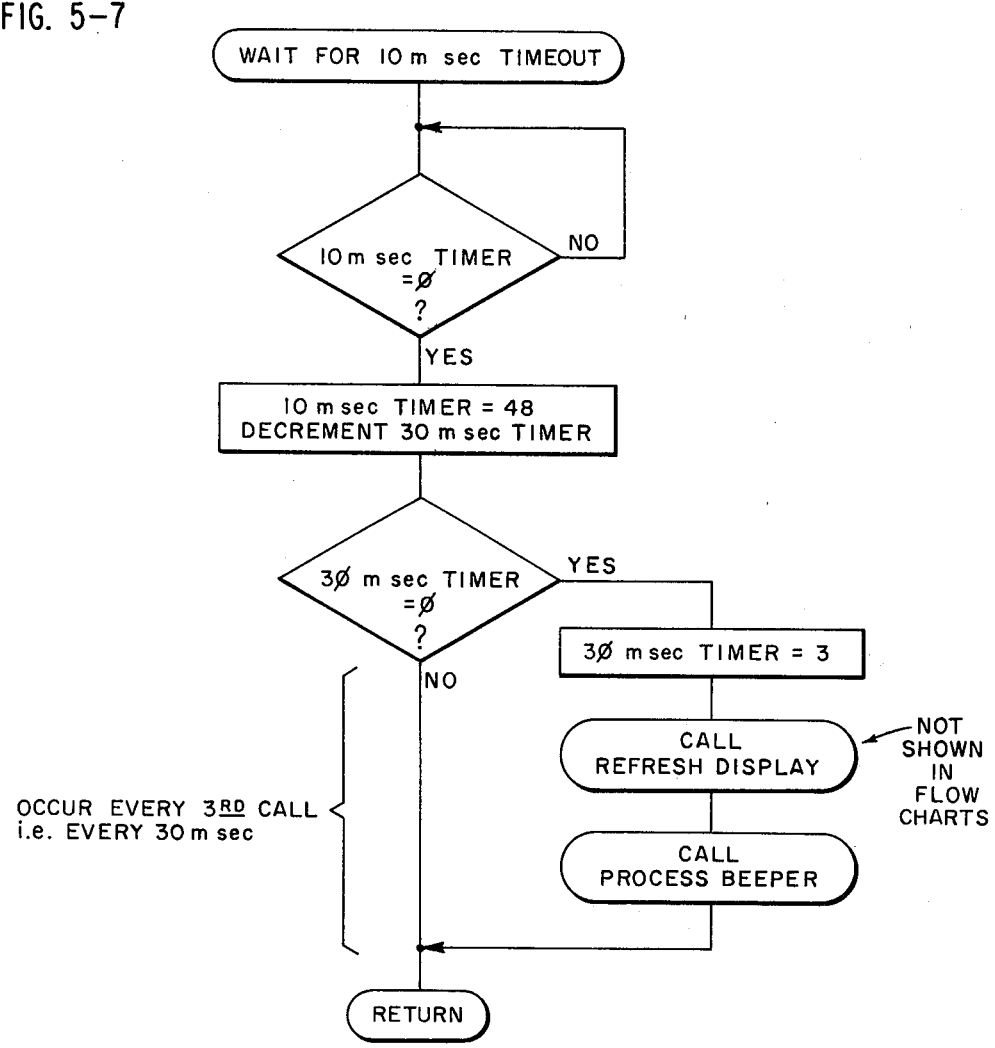
Figures 5, 6, 7, 8:
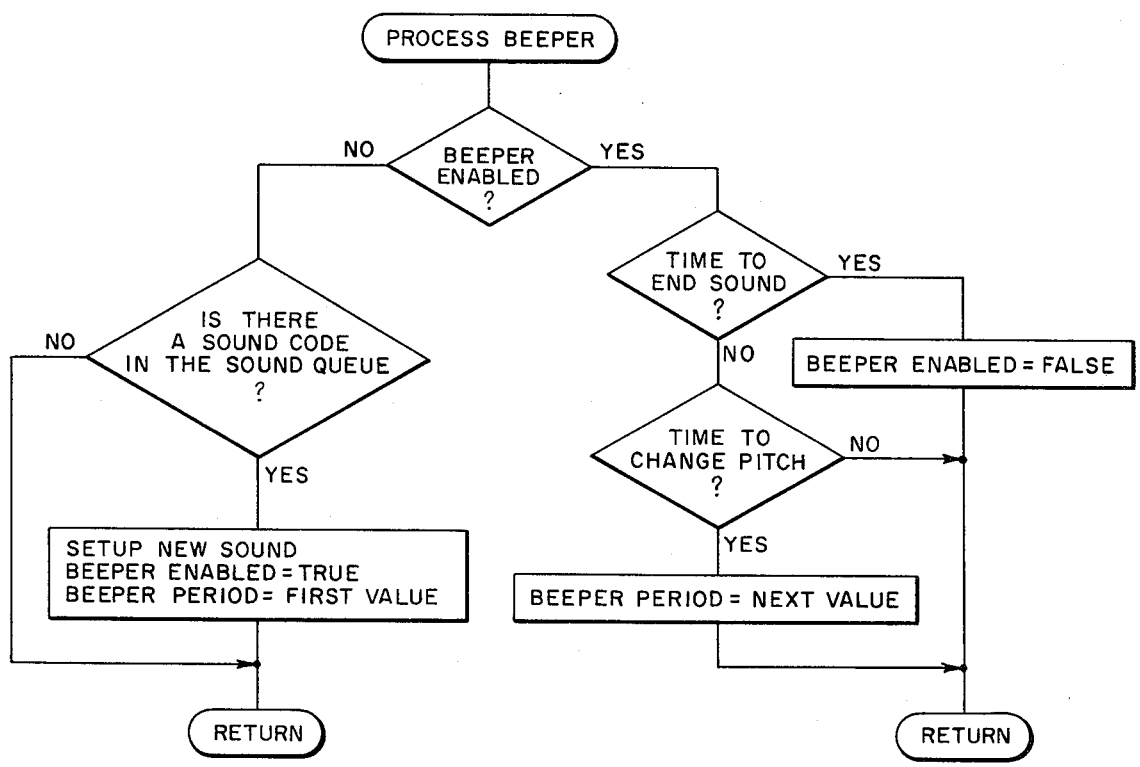
Figures 5, 6, 7, 8, 9:
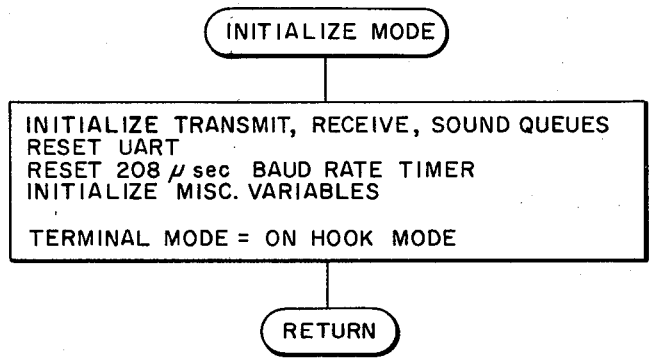
Figures 5, 6, 7, 8, 9, 10:
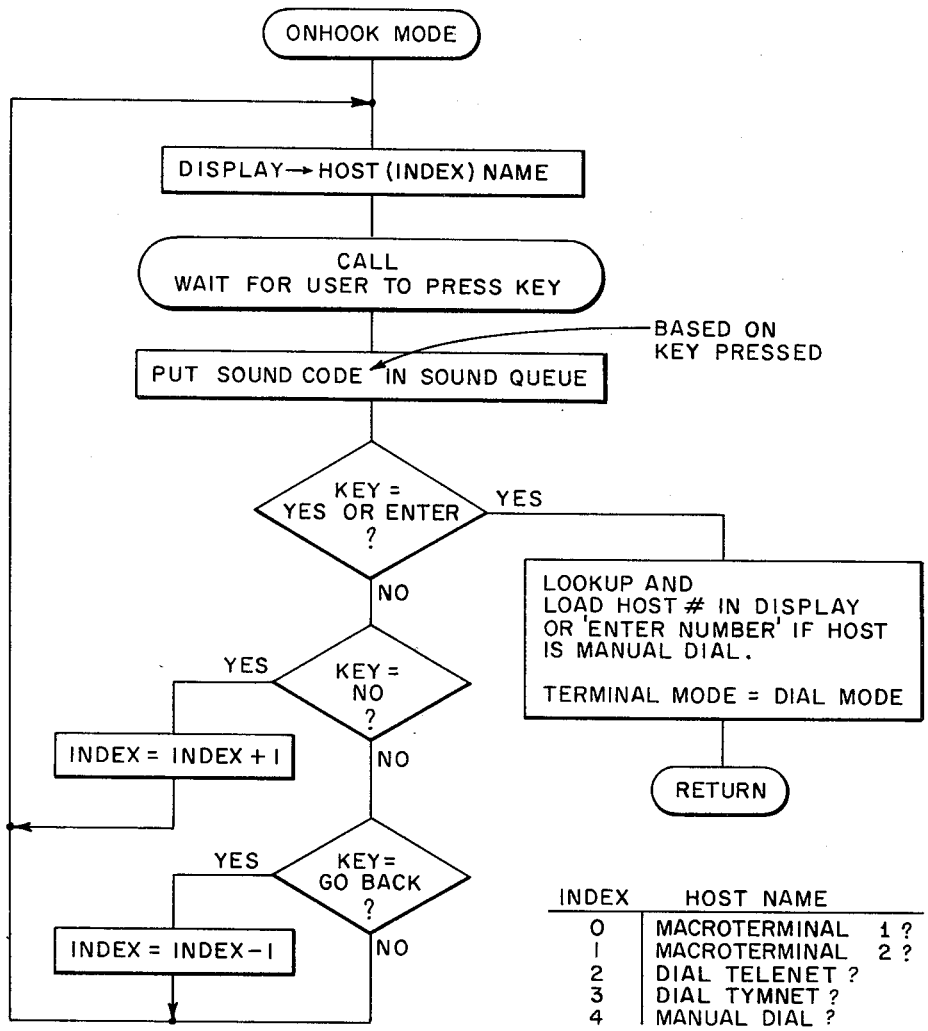
Figures 5, 6, 7, 8, 9, 10, 11:
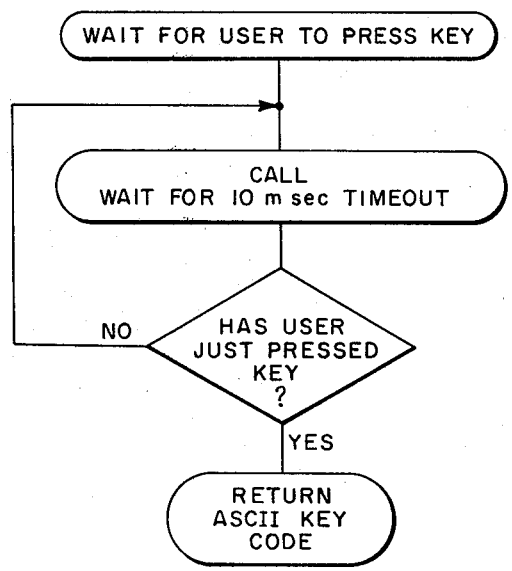
Figures 5, 6, 7, 8, 9, 10, 11, 12:
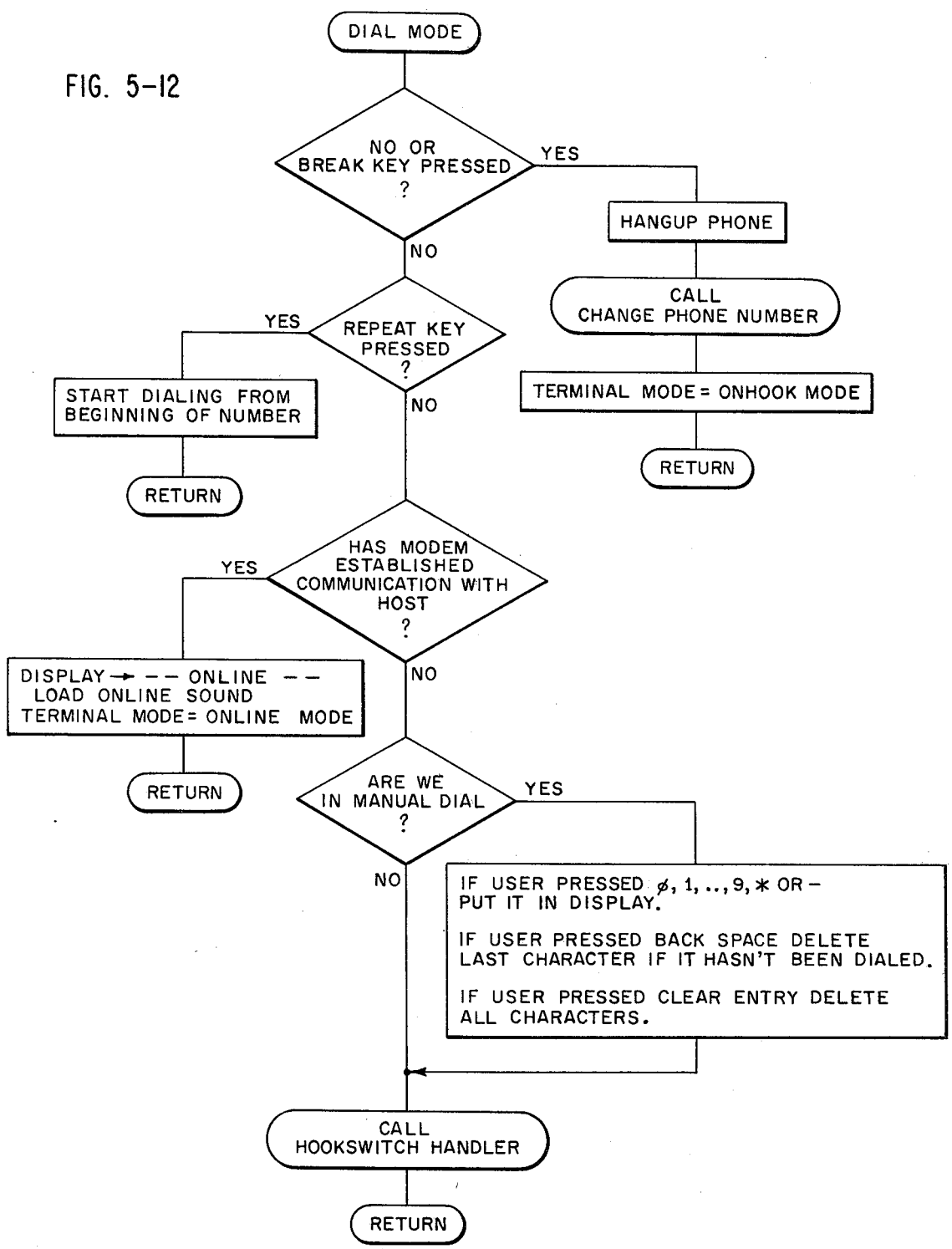
Figures 5, 6, 7, 8, 9, 10, 11, 12, 13:
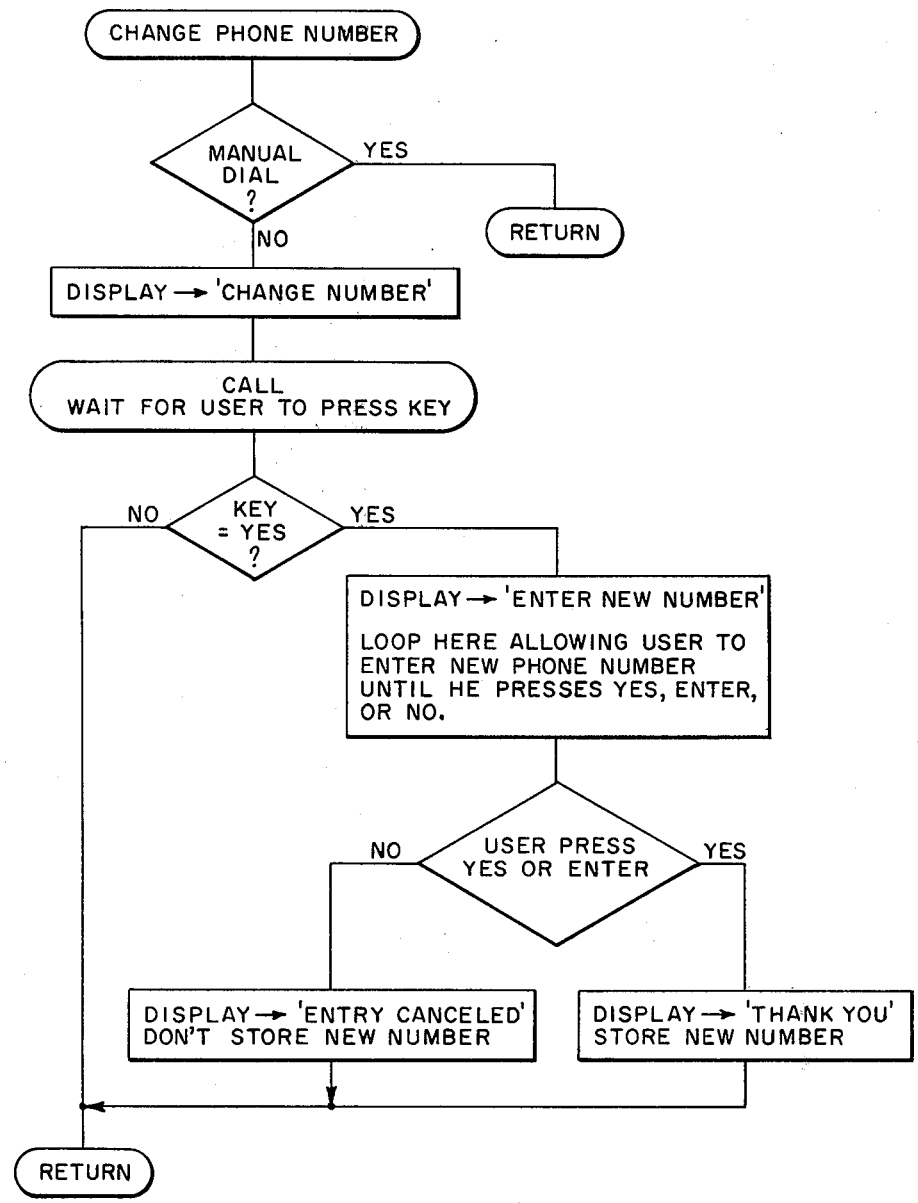
Figures 5, 6, 7, 8, 9, 10, 11, 12, 13, 14, 15, 16:
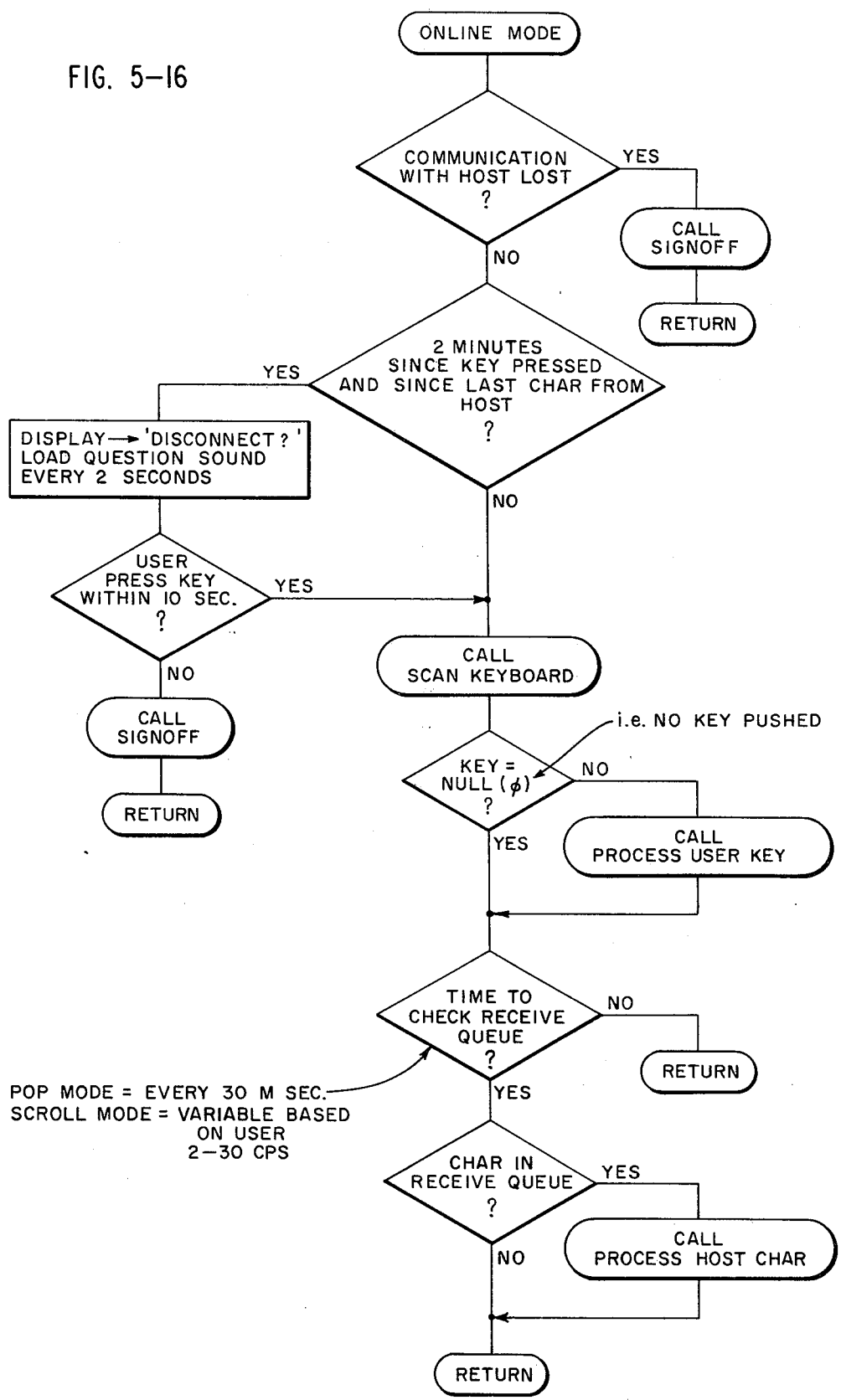
Figures 5, 6, 7, 8, 9, 10, 11, 12, 13, 14, 15, 16, 17:
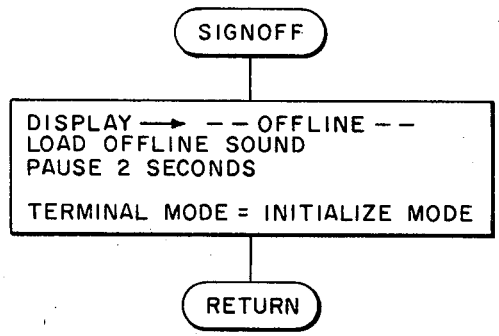
Figures 5, 6, 7, 8, 9, 10, 11, 12, 13, 14, 15, 16, 17, 18:
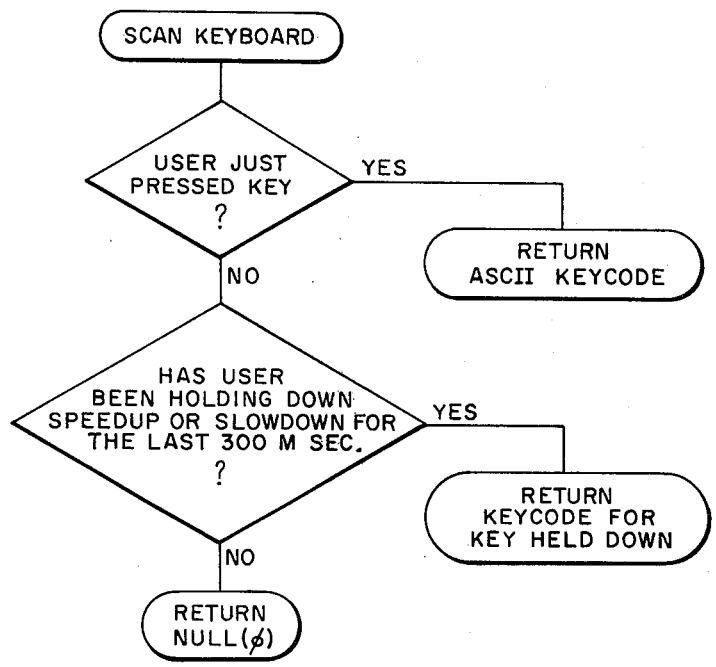
Figures 5, 6, 7, 8, 9, 10, 11, 12, 13, 14, 15, 16, 17, 18, 19:
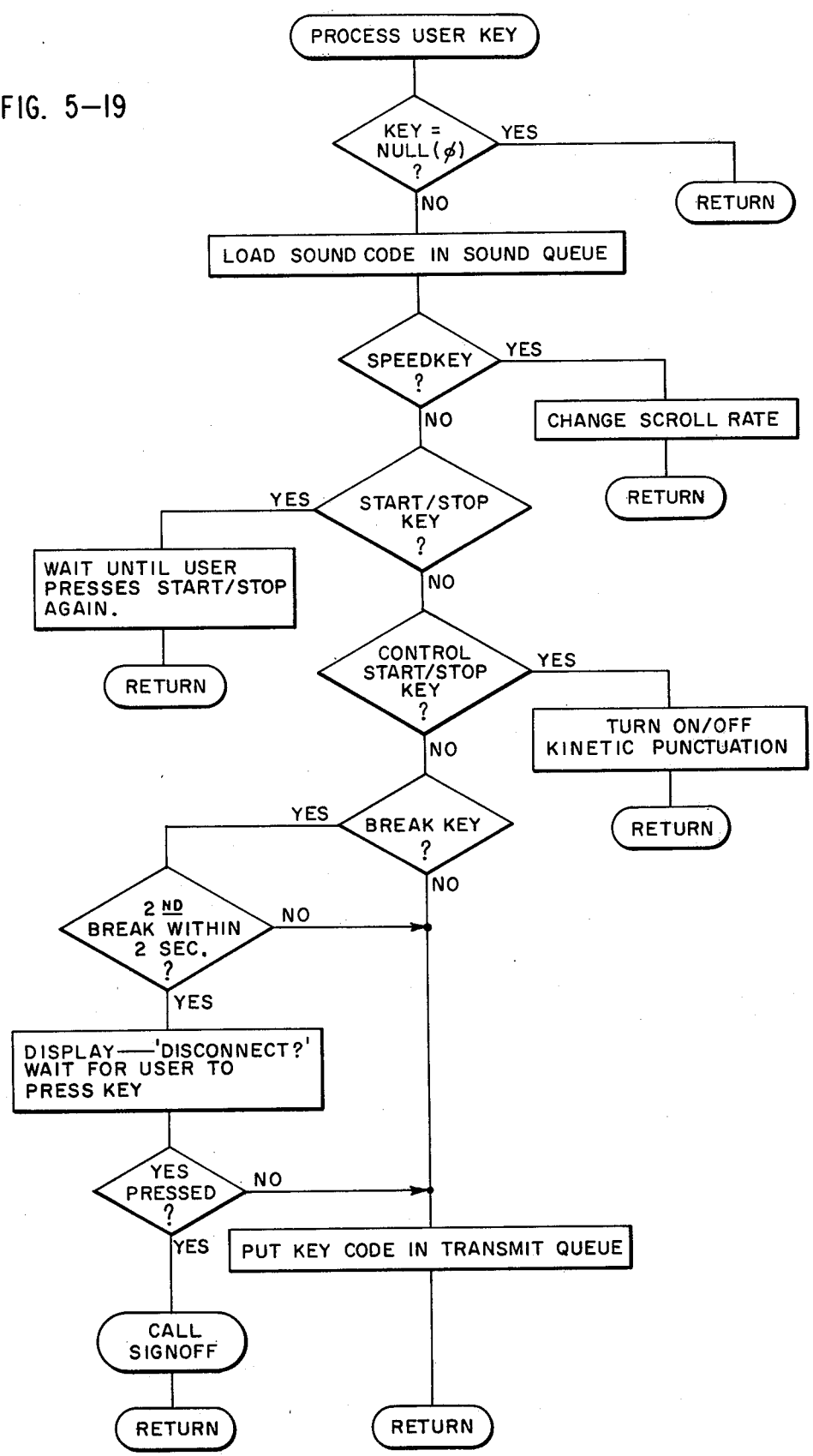
Figures 5, 6, 7, 8, 9, 10, 11, 12, 13, 14, 15, 16, 17, 18, 19, 20:
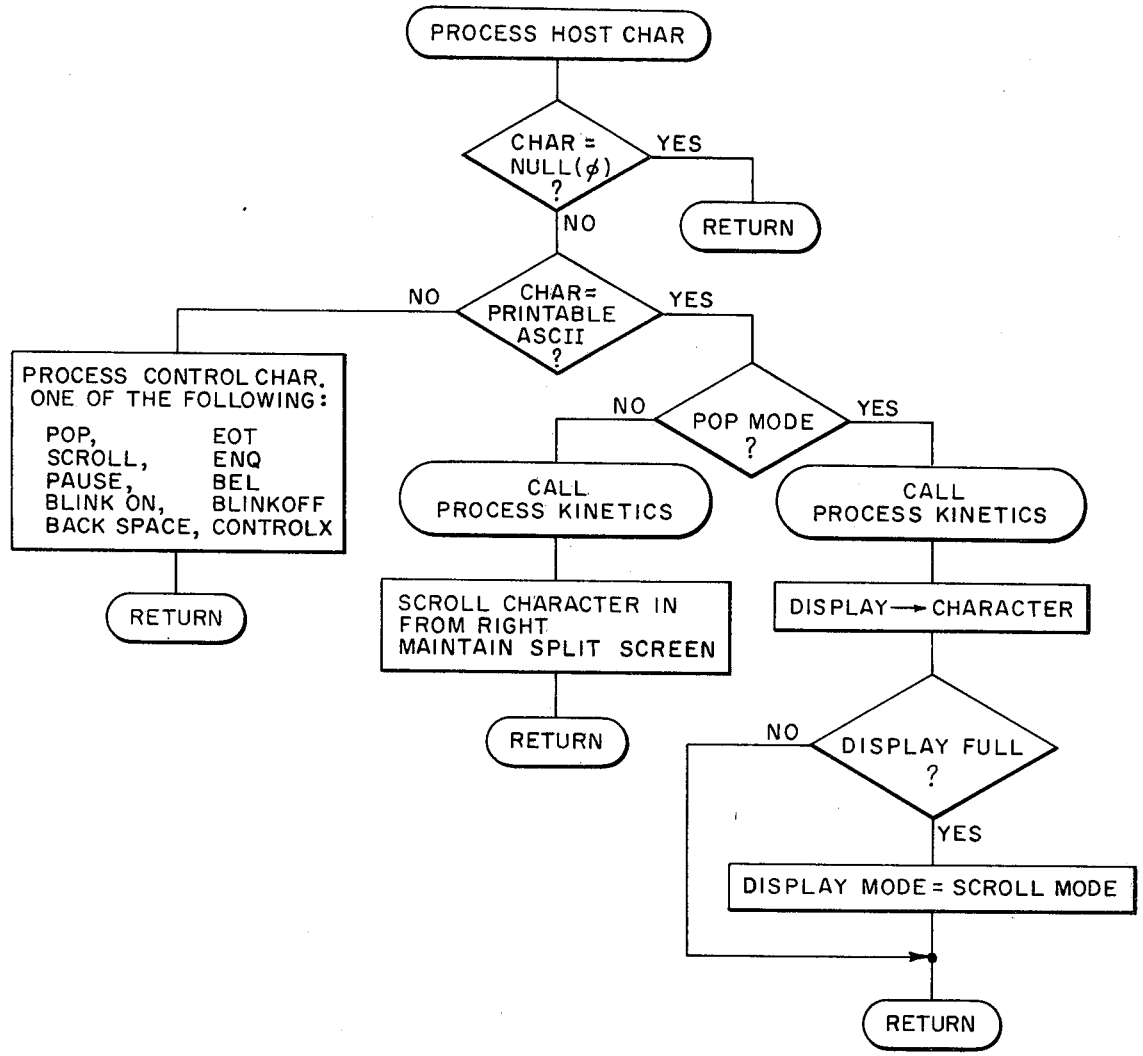
Figures 5, 6, 7, 8, 9, 10, 11, 12, 13, 14, 15, 16, 17, 18, 19, 20, 21:
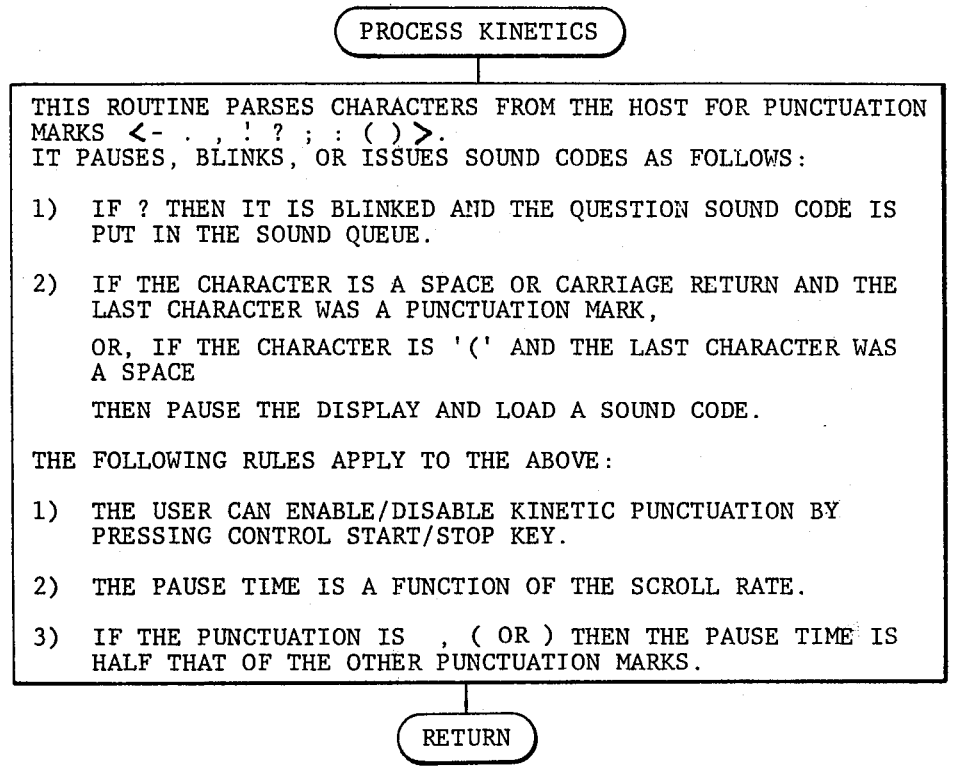
Figures 2, 6:
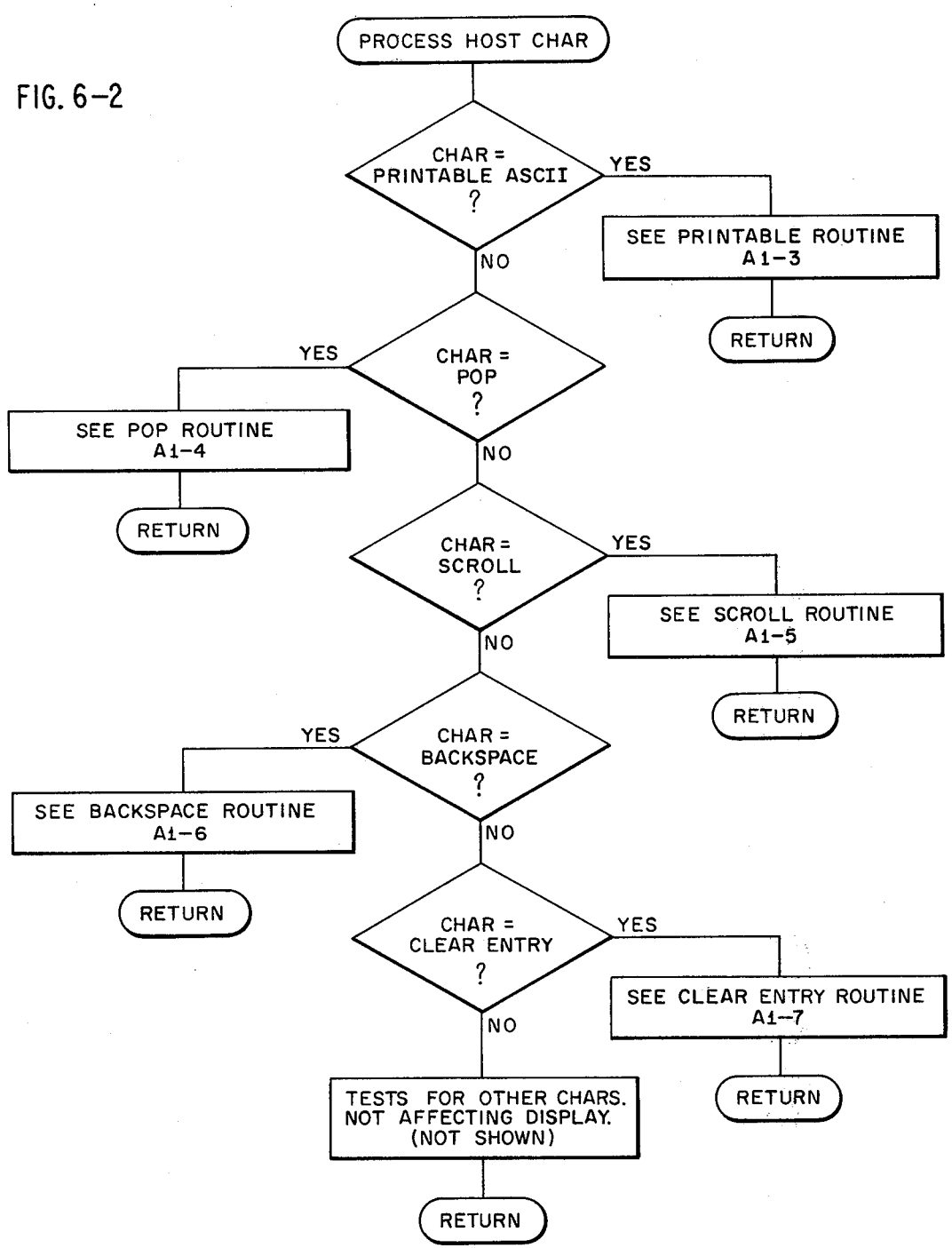
Figures 4, 6:
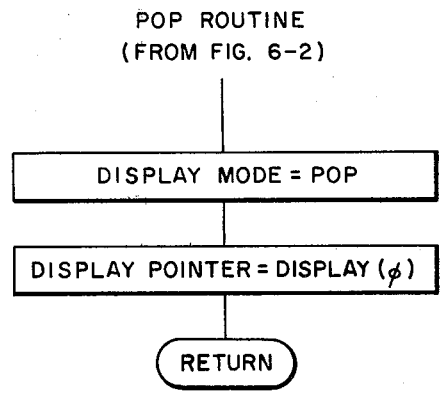
Figures 5, 6:
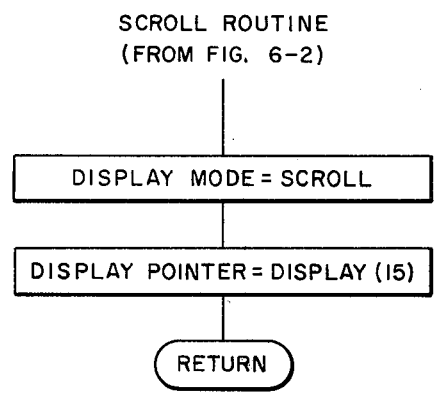
Figure 6:
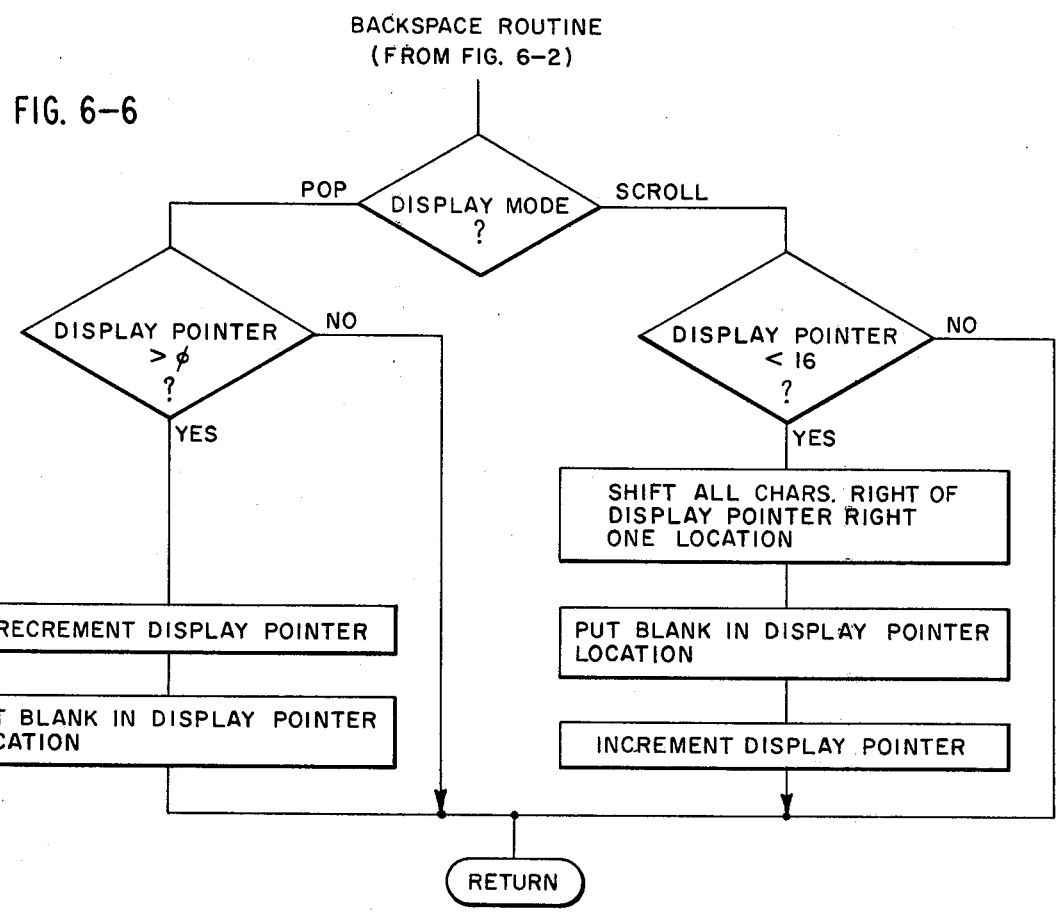
Figures 6, 7:
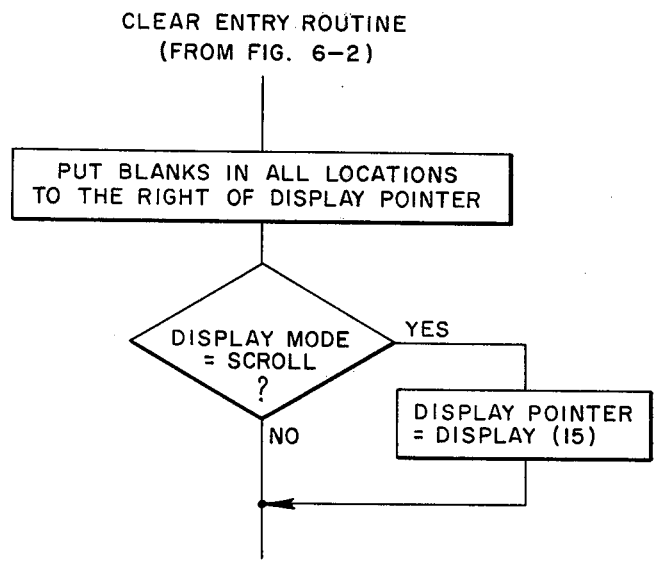

FIG. 5-7 shows the routine termed "wait for ten millisecond time out" which the flow chart of FIG. 5-5 designates.

The process beeper routine which the flow chart of FIG. 5-7 calls once and during every thirty milliseconds is shown in FIG. 5-8. As the term beeper implies, this routine concerns the tone cue aspect of kinetic punctuation, as previously discussed.

The "initialized mode" designated in FIG. 5-5 is shown in FIG. 5-9. The designation in this flow chart of "terminal mode equal onhook mode" designates a state transition, i.e. a change of state from the initialized mode to the onhook mode.

FIG. 5-10 is a flow chart for the "onhook mode" operation. The designation in FIG. 5-10 concerning storing a sound code in the sound cue register of the random access memory 58 places the code for the tone cue that corresponds with the key which the user has selected. As designated, the illustrated terminal loops in the FIG. 5-10 operation until the user keys YES or ENTER, either of which selects the number of a host to be dialed.

The subroutine shown in FIG. 5-10 designated "wait for user to press key" is shown in FIG. 5-11. This routine calls the "wait for ten millisecond time out" routine for the purpose of refreshing the display and processing any tone cue that is to be reported.

When the terminal mode changes to the dial mode state, as occurs during the onhook operation charted in FIG. 5-10, the terminal proceeds with the "dial mode" operation as FIG. 5-12 depicts. This operation occurs before actual dialing takes place. The function is to check if the user wants to stop or repeat the dialing, to determine whether the terminal has established communication with the host, and to check, when the terminal is waiting for the user to manually dial a number, whether the user has entered or wants to delete a digit. Upon the end of this routine, the terminal calls a hook switch handler routine which performs the actual dialing.

The "change phone number" routine which the routine of FIG. 5-12 calls is shown in FIG. 5-13.

FIG. 5-14 diagrams the "hook switch handler routine", which is the routine according to which the illustrated terminal 10 actually dials a telephone number. Note that during states 1 and 5 of this routine, the terminal is monitoring the telephone line and accordingly is conditioned to produce a tone cue which reports to the user the state of the telephone line, as previously discussed. FIG. 5-15 is a hook switch state transition diagram and accordingly details further the state transitions which occur during the routine shown in FIG. 5-14 of the illustrated terminal 10.

The last of the four modes executed in each loop as FIG. 5-5 shows, i.e. the on line mode, is shown in further detail in FIG. 5-16. The sign-off routine which on-line mode calls is shown in FIG. 5-17. FIG. 5-18 shows the routine for the scan keyboard operation to which reference is also made during the on-line mode routine of FIG. 5-16. The on-line mode routine also calls for a process user key routine in the event that the user has just pressed a key; this routine is shown in FIG. 5-19. The routine for processing a host character, which the on-line mode routine of FIG. 5-16 calls, is shown in FIG. 5-20. Many portions of this routine are detailed further in the flow charts of FIG. 6. The process kinetics routine which is called during the process host character routine is described further in FIG. 5-21.

With reference to FIG. 6-1, the display management which the processed host character routine (FIG. 5-20) executes is controlled with two variables, namely display mode and display pointer. These and other variables are stored in the variables register of the random access memory 58 as FIG. 2 designates. The display mode variable can have one of two values, namely pop or scroll. When the variable has the pop condition, it indicates that characters are to be entered into the display element 12 of the terminal 10 (FIG. 2) left-to-right with the pop format previously described at a rate of three hundred baud. Alternatively when the variable is in the scroll condition, it indicates that characters are to be shifted into the display element from the right end at whatever rate the user keys the characters.

The second variable, display pointer, can have one of sixteen values for identifying any single one of the sixteen display locations in the display element 12. This variable hence points to a single display element location and is used to maintain a split screen display. When the display mode variable is pop, the display pointer value is the location where the next character which the terminal receives is to be placed in the display element. However, when the display mode variable is scroll, the value of the display pointer variable is the location of the first character, i.e. of the leftmost character of a message which is entering the display element from the right end. The notation used throughout FIG. 6 is that display location zero is the leftmost physical location in the display element, and display value 15 is the rightmost location in the display element. This is illustrated in FIG. 6-1. In FIG. 6-1, the message HI BOB? is a host message which has been entered by pop format. The displayed user response, i.e. YES, has been entered with the scroll format, and the illustrated display has the split screen format.

The portion of the process host character routine shown in FIG. 6-2 first determines if the character in the receive queue, the presence of which prompted the terminal to call the process host character routine as detailed in FIG. 5-16, is a printable ASCII character. If YES the routine of FIG. 6-2 calls the printable routine shown in FIG. 6-3. Where the character is not a printable ASCII character and the determination accordingly produces a negative result, the routine next tests whether the character is a pop control character from the host. In response to this character, which typically signals the beginning of a host message, the routine proceeds to a pope routine diagrammed in FIG. 6-4. If, however, the determination is negative, the FIG. 6-2 routine proceeds to determine whether the character in the receive queue is a scroll command from the host. If the decision is affirmative, the operation branches to the SCROLL routine which FIG. 6-5 shows. A negative determination, however, advances the FIG. 6-2 routine to test whether the character is a backspace command from the host. If the decision is affirmative, the operation branches to the BACKSPACE routine shown as FIG. 6-6. A negative determination, however, causes the FIG. 6-2 routine to test whether the character is a CLEAR ENTRY character. If it is, the processor proceeds with the CLEAR ENTRY routine shown in FIG. 6-7 and returns. A negative decision causes the FIG. 6-2 routine to test the identity of the character further. The remaining non-printable ASCII characters that might be in the receive queue are not ones that might affect the display and hence are not pertinent to display management. Accordingly, the operation with these non-display effecting characters can follow conventional practices and is not shown in FIG. 6-2.

FIG. 6-3 shows the routine for processing a printable character from the host, i.e. an alphabetic character a, b,-, z or a numeric character 0, 1, 2,-, 9. The first determination made in the routine of FIG. 6-3 is to determine whether the terminal is in the pop display mode or in the scroll display mode. The subsequent steps of the routine, depending on the result of this determination, display the character. When the terminal is in the pop mode, the character will be entered into the display element commencing at the left end and hence the next character comes into the leftmost location of the display element which is available. The display pointer variable designates that location, i.e. the display pointer contents is the location where the next character is to be written into the display element. When all sixteen locations of the illustrated display element are filled, i.e. when the display pointer exceeds fifteen, the display mode variable is set to the scroll condition so that the terminal enters subsequent host characters with the scroll format.

When, on the other hand, the terminal is in the scroll mode, characters are entered in from the right end of the display element. The value of the display pointer variable is the location of the first, i.e. rightmost character, entered in the display element. All characters to the right of this location which the display pointer identifies are shifted left to make room for the new character. Further, when the character to the left of the location which the display pointer identifies is a blank, characters to the left of that display pointer location remain stationary. It will be recalled that these latter steps are the ones that enable the terminal 10 of this invention to retain all or a portion of a host message on the left side of the display element 12 while displaying on the right side of the display element a user entered message, in the manner which FIG. 6-1 illustrates. In response to the ASCII control code identifying pop from the host, the illustrated terminal 10 executes the pop routine to which reference is made in FIG. 6-2 and as shown in FIG. 6-4. These steps set the display mode variable to the pop condition and set the display pointer variable to the leftmost display element location, i.e. location display zero in FIG. 6-1.

Similarly, when the host sends a scroll code character to the terminal, the terminal executes the scroll routine to which reference is made in FIG. 6-2 and as detailed in FIG. 6-5. This routine sets the display mode variable to the scroll condition and sets the display pointer variable to the rightmost display element location, i.e. location 15 in FIG. 6-1.

FIGS. 6-6 and 6-7 detail the display management routines which the processor 10 executes in response to user selection of the BACKSPACE key and in response to selection of the CLEAR ENTRY key. Both routines enable the terminal to maintain a split screen display, with the message that is at the left side of the display element, i.e. which was entered with the pop format, to remain unaffected by either the BACKSPACE operation or by the CLEAR ENTRY operation. More particularly, the BACKSPACE routine of FIG. 6-6 deletes the previous printable character entered in the display element. In the scroll mode, the message which was entered by scrolling is shifted right, while characters to the left of the location which the display pointer identifies remains stationary. Similarly, the CLEAR ENTRY routine of FIG. 6-7 clears all characters to the right of the location which the display pointer variable identifies when operating in the scroll display mode, the display pointer variable is reset to the rightmost display location, i.e. display location 15 in the illustrated embodiment.

It will thus be seen that the objects set forth above, among those made apparent from the preceding description, are efficiently attained. Since certain changes may be made in carrying out the above methods and in the constructions set forth without departing from the scope of the invention, it is intended that all matter contained in the above description or shown in the accompanying drawings, including flow charts, be interpreted and not in a limiting sense.

It is also to be understood that the following claims are intended to cover all of the generic and specific features of the invention herein described, and all statements of the scope of the invention which as a matter of language might be said to fall therebetween.

Having described the invention, what is claimed as new and secured by Letters Patent is:

1. A keyboard and display terminal for communication with a data processing host and having character-entering keys and a character-displaying element and further having the improvement comprising
   A. means for selectively controlling character display on a single line of said display element to start the display of characters in either of first and second spaced-apart locations of said single display line,
   B. means for restricting keyboard control of displayed characters to only those characters for which the display starts at said second display location,
   C. means for extending, along said single display line, the display of characters for which the display started at said second location in the direction toward the display locations of characters for which the display started at said first location, and
   D. means responsive to the extension of characters for which the display started at said second location onto locations displaying characters for which the display started at said first location, for maintaining the display of the latter characters stationary in the absence of such an extension, and for moving the display of the latter characters in the direction of said extension in the presence of such an extension.

2. A keyboard and display terminal for communication with a data processing host and having character-entering keys and a character-displaying element and further having the improvement comprising
   A. means for controlling the display of characters on said display element selectively to scroll characters on the display element, and
   B. means responsive to selected sets of one or more characters for introducing an inter-character space in said scrolled display of characters for providing a punctuation-simulating pause in the character display.

3. A terminal according to claim 2
   A. further comprising user-actuatable means for adjusting the rate of scrolling the character display, and
   B. in which said space-introducing means includes means for adjusting the space duration automatically in correspondence to the adjusted rate of scroll.

4. A terminal according to claim 2 further comprising
   A. user-actuatable means for stopping the scroll of the character display, and
   B. cuing means responsive to said scroll-stopping means to produce a user-perceptible cue during the time said stopping means is operated to stop scroll of the display.

5. A keyboard and display terminal for communication with a data processing host and having character-entering keys and a character-displaying element and further having the improvement comprising
   A. means for connection with a telephone line for providing two-way message communication between the terminal and the data processing host by way of a telephone line,
   B. means for displaying a telephone number on the display element and for responding to user selection of a displayed telephone number for dialing that number by way of a telephone line to which said connection means are connected, and
   C. means for monitoring a telephone line to which said connection means are connected and for producing at least one user-perceptible cue identifying and responsive to a telephone line signal condition selected from the signal conditions including dial tone, dialing signal, ringing signal, and busy signal.

6. A terminal according to claim 5 further comprising means for flashing the display of each digit of said selected displayed telephone number coincident with the dialing of that digit by said displaying and dialing means.

7. Data communications apparatus comprising
   A. a display device capable of displaying only a limited number of alphanumeric characters simultaneously on a single display line, said number being less than forty,
   B. associated with and interconnected to said display device, display register means for holding data defining the characters which are being displayed, the character positions being individually and randomly addressable through said register means for entering a new character in a chosen location in said display without disturbing existing characters in other positions,
   C. coupler means for direct electric connection of the apparatus to a telephone line, said coupler means including frequency selective filter means,
   D. a digital processor,
   E. serial/parallel converter means interconnecting said processor and said coupler means,
   F. a keyboard providing for alphanumeric character entry, said keyboard being interconnected with said processor,
   G. means for signalling that a sequence of characters to be displayed is one of a first sequence or a second sequence,
   H. read-only memory means associated with said processor and containing an operating system, said processor being interconnected with said coupler means for effecting dialing under control of said operating system in accordance with telephone protocols, said operating system further providing
   I. means responsive to a first sequence of characters for entering the first character in the new sequence into the leftmost display position of said single display line, for entering successively subsequent characters in successive positions to the right along said single display line until display line is filled, and then entering further characters in that same sequence into the rightmost display position of said single display line with earlier characters being scrolled to the left,
   J. means responsive to a new second sequence of characters for entering successive characters in that sequence into the rightmost display position of said single display line with earlier characters in the same sequence being scrolled to the left along said single line and replacing the display of characters of any previously entered first sequence, and
   K. means, including a buffer register which initially receives characters from said coupler, for limiting the speed of scrolling of characters across said single display line to a rate level which is operator selectable and is independent of the rate at which characters are received, L. said apparatus including also a pocket-sized case containing said display device, said keyboard, said coupler means, said processor and said memory means.

8. Communications apparatus according to claim 7
A. further comprising a sound-producing transducer,
B. wherein said keyboard includes an increase key and a decrease key, for controlling the scroll rate, and
C. further comprising means responsive to operation of the increase key for increasing the scroll rate in predetermined steps and responsive to operation of the decrease key for decreasing the scroll rate in predetermined steps and, at each such change, initiating with said transducer a sound cue having a change in pitch corresponding to the change in scroll rate.

9. Communications apparatus adapted for use by a lay consumer, said apparatus comprising
A. a display device capable of displaying only a limited number of alphanumeric characters simultaneously in a single display line, said number being not more than thirty-two,
B. associated with and interconnected to said display device, display register means for holding data defining the characters which are being displayed, the character positions being individually and randomly addressable through said register means for entering a new character in a location in said display without disturbing existing characters in other positions,
C. a keyboard providing for alphanumeric character entry,
D. coupler means for direct electric connection of the apparatus to telephone lines, said coupler means including frequency selective filter means,
E. a digital processor,
F. read-only memory means associated with said processor and containing an operating system, said processor being interconnected with said coupler means for effecting dialing under control of said operating system in accordance with telephone protocols, said operating system including also encoding means for transmitting data from either said keyboard or said memory over telephone lines using said coupler means;
G. buffer storage means for holding receiving data prior to display thereof on the display device,
H. means responsive to a control character of a first type for causing a subsequently received alphanumeric characters to be entered into successive locations in said single display line starting with the leftmost location, said means being also responsive to a control character of a second type for causing subsequently received alphanumeric characters to be entered into the rightmost location of said single display line and, as successive characters following the control character are received, for causing previously received characters in the sequence to be scrolled to the left along said display line, and
I. a pocket-sized case containing said display device with display register, said keyboard, said coupler means, said processor, and said memory means.

10. A keyboard and display terminal for communication with a data processing host and having character-entering keys and a display element having multiple character-display locations arrayed in a line, and further having the improvement comprising
A. means for selectively controlling the character display on said display element to start the display of characters identified with a first control signal at a first location along the line of the display element and to start of the display of characters identified with a second control signal at a second location along the line of the display element,
B. means for identifying characters entered by way of said keys with said second control signal and for restricting keyboard control of displayed characters to only those characters for which the display started at said second display-element location, and
C. means for extending into one said location the display of characters for which the display started at the other said location and thereby replacing characters at said one location with characters for which the display started at the other said location.

11. A terminal according to claim 10 in which said display controlling means includes means for identifying at least selected characters communicated from the host, other than characters entered by way of said keys, with said first control signal.

12. A terminal according to claim 10 in which said improvement further comprises
A. means for extending toward said first location the display of characters identified with said second control signal, and
B. means responsive to said extension into locations which display characters identified with said first control signal for displacing from said display line the display of the latter characters in the direction of said extension.

13. A keyboard and display terminal for communication with a data processing host and having character-entering keys and having a display element with plural character-display locations arrayed in a line for displaying at least one line of characters, and further having the improvement comprising
A. means for selectively controlling the character display in said one display line of said display element to display a sequence of one or more characters associated with a second control identification beginning at a second end of the display line and to scroll the display thereof toward the opposite first end of the display line to display further characters of that sequence, and to scroll the concurrent display of characters associated with a first control identification, during said scroll of characters associated with said second identification, with the scroll of the latter characters toward and successively off the first end of the display line,
B. means for providing a user stimulus in a form selected from audible form and visible form in said one display line,
C. register means for storing the identification of characters for display on said display means, and
D. means responsive to the identification in said register means of selected punctuation characters for actuating said stimulus means for providing a user stimulus coincident with the display of selected sets of one or more characters.

14. A terminal according to claim 13 in which said display controlling means includes means for displaying substantially instantaneously on said one line of said display element a full line of characters associated with said first identification, and for scrolling the display thereof to display additional ones of such characters.

15. A terminal according to claim 13 having the further improvement comprising
  A. at least first and second sets each of one or more scroll-controlling function controls, each of which is actuatable by a user of the terminal, and
  B. means responsive to actuation of a control in said first set thereof to change the speed and said scroll of displayed characters, and responsive to actuation of a control in said second set thereof to switch the scroll of displayed characters between a stop condition and a go condition.

16. A terminal according to claim 15 having the further improvement:
  A. in which said first set of function controls includes two separate function keys, and
  B. in which said means responsive to control actuation includes means responsive to actuation of one key in said first set for increasing the speed of scroll and responsive to actuation of the other key of said first set to decrease the speed of scroll.

17. A terminal according to claim 15 having the further improvement comprising cue producing means responsive to the switching of said character-display scroll to the stop condition for producing a perceptible cue for reporting the stopping of the character-display scroll.

18. A terminal according to claim 13 having the further improvement comprising:
  A. at least first, second and third user response function controls, each of which is actuatable by a user of the terminal,
  B. means responsive to actuation of said first user response control for producing, for transmission to a data processing host, a signal sequence identifying a carriage return, and, selectively, identifying a first further response,
  C. means responsive to actuation of said second user response control for producing, for transmission to a data processing host, a signal sequence identifying a clear character response and selectively, a second further response, and
  D. means responsive to actuation of said third user response control for producing, for transmission to a data processing host, a signal sequence identifying a combined carriage return and third further response.

19. A terminal according to claim 18 having the further improvement comprising:
  A. three separate keys forming said first, second and third user-response controls and means forming a YES legend on said first user response key, a NO legend on said second user response key, and a DON'T KNOW legend on said third user response key,
  B. a fourth user response key actuatable by a user and bearing a HELP legend, and
  C. means responsive to actuation of said fourth user response key for producing, for transmission to a data processing host, a signal sequence identifying a combined carriage return and said third further response.

20. A terminal according to claim 13 having the further improvement comprising
  A. user-actuatable control means for changing the speed of said scroll of the character display,
  B. register means for storing characters received from a data processing host and for applying stored characters to said display control means, and
  C. means responsive to the number of characters stored in said register means for selectively producing, for transmission to a data processing host, a first signal sequence identifying a stop sending character message and, alternatively, a second signal sequence identifying a start sending character message.

21. A terminal according to claim 13 having the further improvement comprising:
  A. at least first, second, third and fourth further user response controls each of which is actuatable by a user and means labeling said first further user response control with a repeat legend, means labeling said second further user response control with a go back legend, means labeling said third further user response control with a character-clearing backspace legend, and means labeling said fourth further user response control with a clear entry legend,
  B. means responsive to actuation of said first further user response control for producing a signal sequence identifying a message for causing the display of the last previously-displayed host message,
  C. means responsive to actuation of said second further user response control for producing a signal sequence identifying a message for causing the display of the last message to which a response was entered,
  D. means responsive to actuation of said third further user response control for producing a signal sequence for actuating said display control means to delete from the display element the display of the last character entered by way of said character-entering keys of the terminal, and
  E. means responsive to actuation of said fourth further user response control for actuating said display control means for deleting the immediately-preceding user response entered by way of said character entering keys of the terminal.

22. A terminal according to claim 13 having the further improvement in which said stimulus means includes means for blinking the display of at least one character associated with said first control identification, and includes means for providing selected audible tones in response to actuation of selected keys of said keyboard on the terminal.

23. A keyboard and display terminal for communication with a data processing host and having character-entering keys and a character-display element having a lined array of multiple character display locations, and further having the improvement comprising
  A. means for selectively controlling the character display on the display element to display in a single line characters of a message identified from a first source and concurrently characters of a message identified from a second source which includes the character-entering keys of the terminal, and for scrolling the display along the entirety of said display line to enter the display of additional characters of a message identified from said second source by decreasing the number of locations available for display of characters of a message identified from said first source,
  B. said display controlling means further including means for displaying an entire line of characters of a message identified from said first source and for scrolling the display to enter the display of additional characters of such a message, and C. means responsive to selected sets of one or more characters being entered in said display line during the scrolling of the display for introducing an inter-character space in said scrolled display for providing a punctuation-simulating pause in the character display.

24. A keyboard and display terminal for communication with a data processing host and having character-entering keys and a character-display element having a lineal array of multiple character display locations, and further having the improvement comprising
   A. means for selectively controlling the character display in said one display line of said display element to display characters of a message identified from a second source, which includes the keys of the terminal, beginning at a second end of the display line and to scroll the display thereof toward the opposite first end of the display line to display further characters of said second-source message, and to scroll the concurrent display of characters of a message identified from a first source, during said scroll of characters of said second-source message, with the scroll of characters of said second-source message toward and successively off the first end of the display line, and
   B. means including separate function keys on the keyboard for user communication at the terminal of an affirmative response, a negative response, a "don't know" response, an instruction for deleting the last displayed character of a second-source message, an instruction for deleting a displayed second-source message, an instruction for repeating the currently-displayed message identified from said first source, and an instruction for repeating the previously-displayed message identified from said first source.

25. A keyboard and display terminal for communication with a data processing host and having character-entering keys and a character-displaying element with a pointer, and further having the improvement comprising
   A. first means for storing a display-format variable and for placing said stored display-format variable selectively in at least either of first and second values, and
   B. second means responsive to a first value of said stored display-format variable for introducing the display of a character at a pointer-identified location on a single line of said display element, and responsive to a second value of said stored display-format variable for introducing the display of a character at a scroll-entry location on the same single line of said display element, and for scrolling the display of characters introduced at said scroll-entry location along said single line of said display element in a direction towards said pointer-identified location.

26. A terminal according to claim 25 further comprising
   A. means for storing the pointer location on said single line of said display element, and
   B. means responsive to said stored pointer location having a selected value relative to said scroll-entry location for changing the value of said stored display-format variable from said first value to said second value.

27. A terminal according to claim 25
   A. further comprising register means for storing a value identifying the present location along said single line of said display element of the oldest presently-displayed character introduced at said scroll-entry location, and
   B. in which said second means is responsive to the location-identifying value stored in said register means for selectively scrolling the display of characters introduced at a pointer-identified location.

28. A terminal according to claim 27 in which said second means includes means responding to the coincidence of said location stored in said register means with any location displaying a character introduced at a pointer-identified location, for scrolling the display on said single display line of all characters introduced at a pointer-identified location, together with the scroll of the display of characters introduced at said scroll entry location.

* * * * *